United States Patent
Feher

(10) Patent No.: US 7,421,004 B2
(45) Date of Patent: Sep. 2, 2008

(54) BROADBAND, ULTRA WIDEBAND AND ULTRA NARROWBAND RECONFIGURABLE INTEROPERABLE SYSTEMS

(76) Inventor: Kamilo Feher, 44685 Country Club Dr., El Macero, CA (US) 95618

( * ) Notice: Subject to any disclaimer, the term of this patent is extended or adjusted under 35 U.S.C. 154(b) by 631 days.

(21) Appl. No.: 11/023,279

(22) Filed: Dec. 28, 2004

(65) Prior Publication Data

US 2006/0072646 A1    Apr. 6, 2006

Related U.S. Application Data

(60) Provisional application No. 60/615,678, filed on Oct. 5, 2004.

(51) Int. Cl.
*H04B 1/00* (2006.01)
(52) U.S. Cl. ........................ 375/130; 375/131
(58) Field of Classification Search ................ 375/371, 375/354, 298, 242, 206, 130, 131
See application file for complete search history.

(56) References Cited

U.S. PATENT DOCUMENTS

| | | | |
|---|---|---|---|
| 4,528,676 A * | 7/1985 | Mein et al. ................... 375/232 |
| 4,742,532 A | 5/1988 | Walker | |
| 5,185,765 A | 2/1993 | Walker | |
| 5,226,058 A * | 7/1993 | Anderson et al. ............ 375/130 |
| 5,909,461 A * | 6/1999 | Koga et al. .................. 375/151 |
| 5,930,303 A | 7/1999 | Walker | |
| 6,128,330 A | 10/2000 | Schilling | |
| 6,198,777 B1 | 3/2001 | Feher | |
| 6,301,308 B1 | 10/2001 | Rector | |
| 6,445,737 B1 | 9/2002 | Walker | |
| 6,445,749 B2 | 9/2002 | Feher | |
| 6,470,055 B1 | 10/2002 | Feher | |
| 6,665,348 B1 | 12/2003 | Feher | |
| 6,735,238 B1 | 5/2004 | McCorkle | |
| 6,748,021 B1 | 6/2004 | Daly | |
| 6,748,022 B1 | 6/2004 | Walker | |
| 6,757,334 B1 | 6/2004 | Feher | |
| 6,772,063 B2 | 8/2004 | Ihara et al. | |
| 6,774,685 B2 | 8/2004 | O'Toole et al. | |
| 6,774,841 B2 | 8/2004 | Jandrell | |
| 6,775,254 B1 | 8/2004 | Willenegger et al. | |
| 6,775,324 B1 | 8/2004 | Mohan et al. | |
| 6,775,371 B2 | 8/2004 | Elsey et al. | |
| 7,180,972 B1 * | 2/2007 | Venkata et al. .............. 375/371 |
| 2004/0096010 A1 * | 5/2004 | Koval ......................... 375/298 |
| 2005/0100102 A1 * | 5/2005 | Gazdzinski et al. ......... 375/242 |

OTHER PUBLICATIONS

U.S. Appl. No. 10/205,478, filed Jul. 24, 2002, Feher, K.

(Continued)

*Primary Examiner*—Mohammed Ghayour
*Assistant Examiner*—Sonia J King

(57) ABSTRACT

Broadband, ultra wideband and ultra narrowband (UWN) reconfigurable, interoperable communication and broadcasting system architectures, combinations and hybrids of ultra wideband (UWB), ultra narrowband (UNB) and efficient broadband wireless, baseband, intermediate frequency (IF) and radio frequency (RF) implementations for Bit Rate Agile (BRA) reconfigurable and interoperable systems, Adaptive Modulation and Coding (AMC). Processing the data signals, of clock signals, and/or carrier cycles waveforms leads to shaped radio-frequency (RF) cycles, waveforms and wavelets. With Multiple Input Multiple Output (MIMO) diversity and protection system configuration the performance and capacity of these systems may be further enhanced.

3 Claims, 22 Drawing Sheets

OTHER PUBLICATIONS

U.S. Appl. No. 10/831,562, filed Apr. 23, 2004, Feher, K.
U.S. Appl. No. 10/831,724, filed Apr. 24, 2004, Feher, K.
U.S. Appl. No. 09/732,953, filed Dec. 7, 2000, Feher, K.
U.S. Appl. No. 60/615,678, filed Oct. 5, 2004, Feher, K.
U.S. Appl. No. 09/916,054, filed May 16, 2002, Bobier, J.A.
U.S. Appl. No. 10/305,109, filed Aug. 28, 2003, McCorkle, J. W.
U.S. Appl. No. 10/360,346, filed Aug. 7, 2003, Shattil, S. J.
U.S. Appl. No. 11/022,279, filed Dec. 22, 2004, Feher, K., "Broadband, Ultra Wideband and Ultra Narrowband Reconfigurable Interoperable Systems".
U.S. Appl. No. 11/102,896, filed Dec. 22, 2004, Feher, K., "Hybrid Communication and Broadcast Systems".
U.S. Appl. No. 11/023,254, filed Dec. 22, 2004, Feher, K., "Data Communication for Wired and Wireless Communication".
Lin, J.S., Feher, K.: "Ultra Spectrally Efficient Feher Keying (FK) Developments" Proceedings of the European Telemetry Conference Germany, May 2002 9 pages.
Furuscar, A. et al .: "EDGE: Enhanced Data Rates for GSM and TDMA/136 Evolution" IEEE Personal Communications, Jun. 1999, (an IEEE Magazine); pp. 56-66.
Brown, C., Feher, K: "A reconfigurable modem for increased network capacity and video, voice, and data transmission over GSM PCS", IEEE Transactions on Circuits and Systems for Video Technology, pp. 215-224; vol. 6, No. 2, Apr. 1996 (10 pages).
Brown, C.W.: "New Modulation and Digital Synchronization Techniques for Higher Capacity Mobile and Personal Communications Systems" Ph.D. Thesis University of California, Davis, Nov. 1, 1996 pp. i-vii; 138-190; 269-272; 288-289; 291.
Brown, C., Feher, K. : "A Flexible Modem Structure for Increased Network Capacity and Multimedia Transmission in GSM PCS", Proceedings of the Fifteenths Annual Joint Conference of the IEEE Computer and Communication Societies (INFOCOM '96), 1996 (8 pages).
3GPP TS 25.213 V6.0.0 (Dec. 2003) $3^{rd}$ Generation Partnership Project; Technical Specification Group Radio Access Network Spreading and Modulation (FDD) (Release 6) 28 pages.
3GPP TS 05.04 V8.4.0 (Nov. 2001) Technical Specification Group GSM/EDGE Radio Access Network; Digital cellular telecommunications system (Phase 2+); Modulation (Release1999); 3GPP:$3^{rd}$ Generation Partnership Project; (10 pages).

* cited by examiner c) Missing Cycle MCY 1:8 d) Phase Reversal Keying (PRK) 1:8 a) NRZ 1001 non-balanced pattern b) NRZ 1001 balanced pattern a) Missing Cycle 1:4 b) Phase Reversal 1:4 at start for Zero state only a) 4 Cycles per bit with reduced amplitudes for 0 states b) Single cycle per bit with zero transmit for 0 State c) Single cycle per bit with one waveform transmission for the 0 State and an other waveform for the one state

US 7,421,004 B2

BROADBAND, ULTRA WIDEBAND AND ULTRA NARROWBAND RECONFIGURABLE INTEROPERABLE SYSTEMS

RELATED APPLICATIONS

This application claims the benefit under 35 U.S.C 119(e) of U.S. Provisional Patent Application Ser. No: 60/615,678 entitled "ULTRA WIDEBAND, ULTRA NARROWBAND AND RECONFIGURABLE INTEROPERABLE SYSTEMS" filed on Oct. 5, 2004 by Applicant Feher, K., Ref. No.[21] and incorporated herein by reference.

The following three (3) related U.S. patent applications are co-pending:

U.S. utility patent application Ser. No. 11/023,279, Feher, K., submitted to the United States Patent and Trademark Office (USPTO) on Dec. 22, 2004 entitled "BROADBAND, ULTRA WIDEBAND AND ULTRA NARROWBAND RECONFIGURABLE INTEROPERABLE SYSTEMS"

U.S. Utility patent application Ser. No. 11/102,896, Feher, K., submitted to the United States Patent and Trademark Office (USPTO) on Dec. 22, 2004 entitled "HYBRID COMMUNICATION AND BROADCAST SYSTEMS"

U.S. Utility patent application Ser. No. 11/023,254, Feher, K., submitted to the United States Patent and Trademark Office (USPTO) on Dec. 22, 2004 entitled "DATA COMMUNICATION FOR WIRED AND WIRELESS COMMUNICATION"

FIELD OF THE INVENTION

This invention pertains generally to radio frequency (RF) spectrally efficient and power efficient systems, to ultra wideband (UWB), to wideband, to broadband, to spectral efficient, to narrowband, ultra narrowband(UNB) communication, to efficient communication and broadcasting systems, modulation and demodulation(Modem), architectures for baseband, intermediate frequency (IF) and radio frequency (RF) implementations. Bit stream processing, shaping of data signals and shaping or processing of clock and carrier waveforms leads to spectrally efficient and power efficient shaped radio-frequency (RF) waveforms and wavelets.

ACRONYMS

To facilitate comprehension of the current disclosure, some of the acronyms used in the prior art and/or in the current disclosure are highlighted in the following LIST of acronyms:

| | |
|---|---|
| 2G | Second generation or $2^{nd}$ generation |
| 3G | Third Generation or $3^{rd}$ generation |
| AMC | Adaptive Modulation and Coding |
| ACM | Adaptive Coding and Modulation |
| BRA | Bit Rate Agile |
| BWA | Broadband Wireless Access |
| CDMA | Code Division Multiple Access |
| CM | Clock Modulated |
| CS | Code Selectable |
| CSMA | Collision Sense Multiple Access |
| CL | Clock Shaped |
| EDGE | Enhanced Digital GSM Evolution; Evolution of GSM or E-GSM |
| FA | Frequency Agile (selectable or switched IF or RF frequency) |
| FOC | Fiber Optic Communication |
| GPS | Global Positioning System |

-continued

| | |
|---|---|
| IR | Infrared |
| LR | Long Response |
| MAW | Modified Amplitude Wavelets |
| MAWM | Modified Amplitude Wavelet Modulation |
| MCH | Missing Chip |
| MCY | Missing Cycle |
| MCYM | Missing Cycle Modulation |
| MFS | Modulation Format Selectable |
| MIMO | Multiple Input Multiple Output |
| MMIMO | Multimode Multiple Input Multiple Output |
| NRZ | Non Return to Zero |
| PMK | Phase Modification Keying |
| PPM | Pulse Position Modulation |
| PRK | Phase Reversal Keying |
| RFID | Radio Frequency Identification |
| STCS | Shaped Time Constrained Signal |
| TCS | Time Constrained Signal |
| UMTS | Universal Mobile Telecommunication System |
| UNB | Ultra Narrow Band |
| UWB | Ultrawideband |
| UWN | Ultrawideband-Ultra Narrow Band |
| W | waveform, wavelet or wave (signal element) |
| WCDMA | Wideband Code Division Multiple Access |

CITED REFERENCES—PARTIAL LIST OF RELEVANT LITERATURE

Several references, including issued United States patents, pending U.S. patents, and other references are identified herein to assist the reader in understanding the context in which the invention is made, some of the distinctions of the inventive structures and methods over that which was known prior to the invention, and advantages of this new invention, the entire contents of which being incorporated herein by reference. This list is intended to be illustrative rather than exhaustive.

All publications including patents, pending patents, documents, published papers, articles and reports listed or mentioned in these publications and/or in this disclosure-patent/invention are herein incorporated by reference to the same extent as if each publication or report, or patent or pending patent and/or references listed in these publications, reports, patents or pending patents were specifically and individually indicated to be incorporated by reference.

CROSS REFERENCE TO U.S. PAT. DOCUMENTS

The following referenced documents contain subject matter related to that disclosed in the current disclosure:

REFERENCE No.:

1. U.S. Pat. No. 6,748,022 Walker, H. R.: "Single Sideband Suppressed Carrier Digital Communications Method and System", Issued Jun. 8, 2004.

1. U.S. Pat. No. 6,445,737 Walker, H. R.: "Digital modulation device in a system and method of using the same", Issued Sep. 3, 2002.

2. U.S. Pat. No. 5,930,303 Walker, H. R.: "Digital Modulation Employing Single Sideband with Suppressed Carrier", Issued Jul. 27, 1999.

3. U.S. Pat. No. 5,185,765 Walker, H. R.: "High Speed Data Communication System Using Phase Shift Key Coding", Issued Feb. 9, 1993.

4. U.S. Pat. No. 4,742,532 Walker, H. R.: "High Speed Binary Data Communication System", Issued May 3, 1988.

5. U.S. Pat. No. 6,775,324 Mohan, C. et al.: "Digital Signal Modulation System", Issued Aug. 10, 2004.

6. U.S. Pat. No. 6,301,308 Rector, R.: "System and Method for High Speed Data Transmission", Issued Oct. 9, 2001.

7. U.S. Pat. No. 6,774,685 O'Toole et al.: "Radio Frequency Data Communication Device", Issued Aug. 10, 2004.

8. U.S. Pat. No. 6,774,841 Jandrell, L. H. M: "Method and System for Processing Positioning Signals in a Geometric Mode", Issued Aug. 10, 2004.

9. U.S. Pat. No. 6,772,063 Ihara et al.: "Navigation Device, Digital Map Display System, Digital Map Displaying Method in Navigation Device, and Program", Issued Aug. 3, 2004.

10. U.S. Pat. No. 6,775,254 Willenegger et al.: "Method and Apparatus for Multiplexing High Speed Packet Data Transmission with Voice/Data Transmission", Issued Aug. 10, 2004.

11. U.S. Pat. No. 6,748,021 Daly, N.: "Cellular radio communications system," Issued Jun. 8, 2004

12. U.S. Pat. No. 6,128,330 Schilling; D. L.: "Efficient shadow reduction antenna system for spread spectrum", issued Oct. 3, 2000.

13. U.S. Pat. No. 6,775,371 Elsey et al.: "Technique for Effectively Providing Concierge-Like Services in a Directory Assistance System", issued Aug. 10, 2004.

14. U.S. Pat. No. 6,735,238 McCorkle, J. W.: "Ultra wideband communication system, method, and device with low noise pulse formation", issued May 11, 2004.

15. U.S. Pat. No. 6,198,777 Feher, K.: "Feher Keying (FK) Modulation and Transceivers Including Clock Shaping Processors", issued March 2001

16. U.S. Pat. No. 6,470,055 Feher, K.: "Spectrally efficient FQPSK, FGMSK, and FQAM for enhanced performance CDMA, TDMA, GSM, OFDN, and other systems", issued Sep. 3, 2002.

17. U.S. Pat. No. 6,665,348 Feher, K.: "System and Method for Interoperable Multiple-Standard Modulation and Code Selectable Feher's GMSK, Enhanced GSM, CSMA, TDMA, OFDM, and other Third-Generation CDMA, WCDMA and B-CDMA", issued Dec. 16, 2003.

18. U.S. Pat. No. 6,757,334 Feher, K.: "Bit Rate Agile Third-Generation wireless CDMA, GSM, TDMA and OFDM System", issued Jun. 29, 2004

19. U.S. Pat. No. 6,445,749 Feher, K. "FMOD Transceivers Including Continuous and Burst Operated TDMA, FDMA, Spread Spectrum CDMA, WCDMA and CSMA,", issued Sep. 3, 2002

CROSS REFERENCE TO RELATED U.S. PATENT APPLICATIONS

REFERENCE No. (continued):

20. U.S. pat Provisional Application Ser. No: 60/615,678, Applicant Feher, K. "ULTRA WIDEBAND, ULTRA NARROWBAND AND RECONFIGURABLE INTEROPERABLE SYSTEMS" filed on Oct. 5, 2004.

21. U.S. Utility patent application Ser. No. 11/023,279, Applicant Feher, K., submitted to the United States Patent and Trademark Office (USPTO) on Dec. 22, 2004 and entitled "BROADBAND, ULTRA WIDEBAND AND ULTRA NARROWBAND RECONFIGURABLE INTEROPERABLE SYSTEMS".

22. U.S. Utility patent application Ser. No. 11/102,896, Applicant Feher, K., submitted to the United States Patent and Trademark Office (USPTO) on Dec. 22, 2004 and entitled "HYBRID COMMUNICATION AND BROADCAST SYSTEMS".

23. U.S. Utility patent application Ser. No. 11/023,254, Feher, K., submitted to the United States Patent and Trademark Office (USPTO) on Dec. 22, 2004 and entitled "DATA COMMUNICATION FOR WIRED AND WIRELESS COMMUNICATION".

24. U.S. patent application Ser. No: 09/916054: Bobier, Joseph A.; (Cudjoe Key, Fla.); Khan, Nadeem; (Cudjoe Key, Fla.): "Suppressed cycle based carrier modulation using amplitude modulation" Pub. No.: US 2002/0058484, published May 16, 2002

25. U.S. patent application Ser. No.: 10/305109 McCorkle, John W. et al.; Pat. Pub. No 20030161411, published: Aug. 28, 2003

26. U.S. patent application Ser. No: 10/360,346 Shattil, Steve J.; "Unified Multi-Carrier Framework for Multiple-Access Technologies," Pub. No.: US 2003/0147655, published Aug. 7, 2003

27. U.S. patent application Ser. No: 10/205,478: K. Feher: "Spectrally Efficient FQPSK, FGMSK and FQAM for Enhanced Performance CDMA, TDMA, GSM, OFDM, and Other Systems," U.S. patent application Ser. No. 10/205,478, filed Jul. 24, 2002 Continuation of U.S. patent application Ser. No. 09/370,360 filed Aug. 9, 1999. Provisional Application No. 60/095,943 filed on Aug. 10, 1998.

28. U.S. patent application Ser. No: 10/831,562 : K. Feher: "Adaptive Receivers for Bit Rate Agile(BRA) and Modulation Demodulation (Modem) Format Selectable (MFS ) Signals". Filed on Apr. 23, 2004, Continuation of 09.370,362 filed Aug. 9, 1999

29. U.S. patent application Ser. No: 10/831, K. Feher: "CDMA,W-CDMA, $3^{rd}$ Generation Interoperable Modem Format Selectable (MFS) systems with GMSK modulated systems", filed on Apr. 24, 2004, Continuation of 09.370,362 filed Aug. 9, 1999

30. U.S. patent application Ser. No: 09/732,953, Pub. No.: US 2001/0016013 Published Aug. 23, 2001 K. Feher: Changed title to: "ULTRA EFFICIENT MODULATION AND TRANSCEIVERS" in Supplemental Amendment—submitted to USPTO on Aug. 13, 2004, Filed Dec. 7, 2000. Continuation of application Ser. No. 09/385,693 filed on Aug. 30, 1999; Provisional Application No. 60/098,612, filed Aug. 31, 1998. Now U.S. Pat. No. 6,198,777 issued Mar. 6, 2001.

CROSS REFERENCE TO RELATED PUBLICATIONS

31. Lin, J. S., Feher, K: "Ultra Spectrally Efficient Feher keying (FK) Developments" Proceedings of the European Telemetry Conference (ETC), ETC-2002, Garmisch-Partternkirche, Germany, May 2002

32. Furuscar, A. et al.: "EDGE: Enhanced Data Rates for GSM and TDMA/136 Evolution" IEEE Personal Communications, June 1999, (an IEEE Magazine); pp: 56-66

33. Brown, C., Feher, K: "A reconfigurable modem for increased network capacity and video, voice, and data transmission over GSM PCS", IEEE Transactions on Circuits and Systems for Video Technology, pp: 215-224; Volume: 6, No. 2, April 1996 (10 pages)

34. Brown, C. W.: "New Modulation and Digital Synchronization Techniques for Higher Capacity Mobile and Personal Communications Systems" Ph.D. Thesis University of California, Davis, Nov. 1, 1996 pp: i-vii;138-190; 269-272; 288-289;291.

35. Brown, C., Feher, K. : "A Flexible Modem Structure for Increased Network Capacity and Multimedia Transmission in GSM PCS", Proceedings of the Fifteenths Annual Joint Conference of the IEEE Computer and Communication Societies (INFOCOM '96), 1996 (8 pages)

36. 3GPP TS 25.213 V6.0.0 (2003-12) 3$^{rd}$ Generation Partnership Project; Technical Specification Group Radio Access Network Spreading and Modulation (FDD) (Release 6) 28 pages 37. 3GPP TS 05.04 V8.4.0 (2001-11) Technical Specification Group GSM/EDGE Radio Access Network; Digital cellular telecommunications system (Phase 2+); Modulation (Release 1999); 3GPP:3$^{rd}$ Generation Partnership Project; (10 pages)

NEED FOR THIS INVENTION

Figure 1:
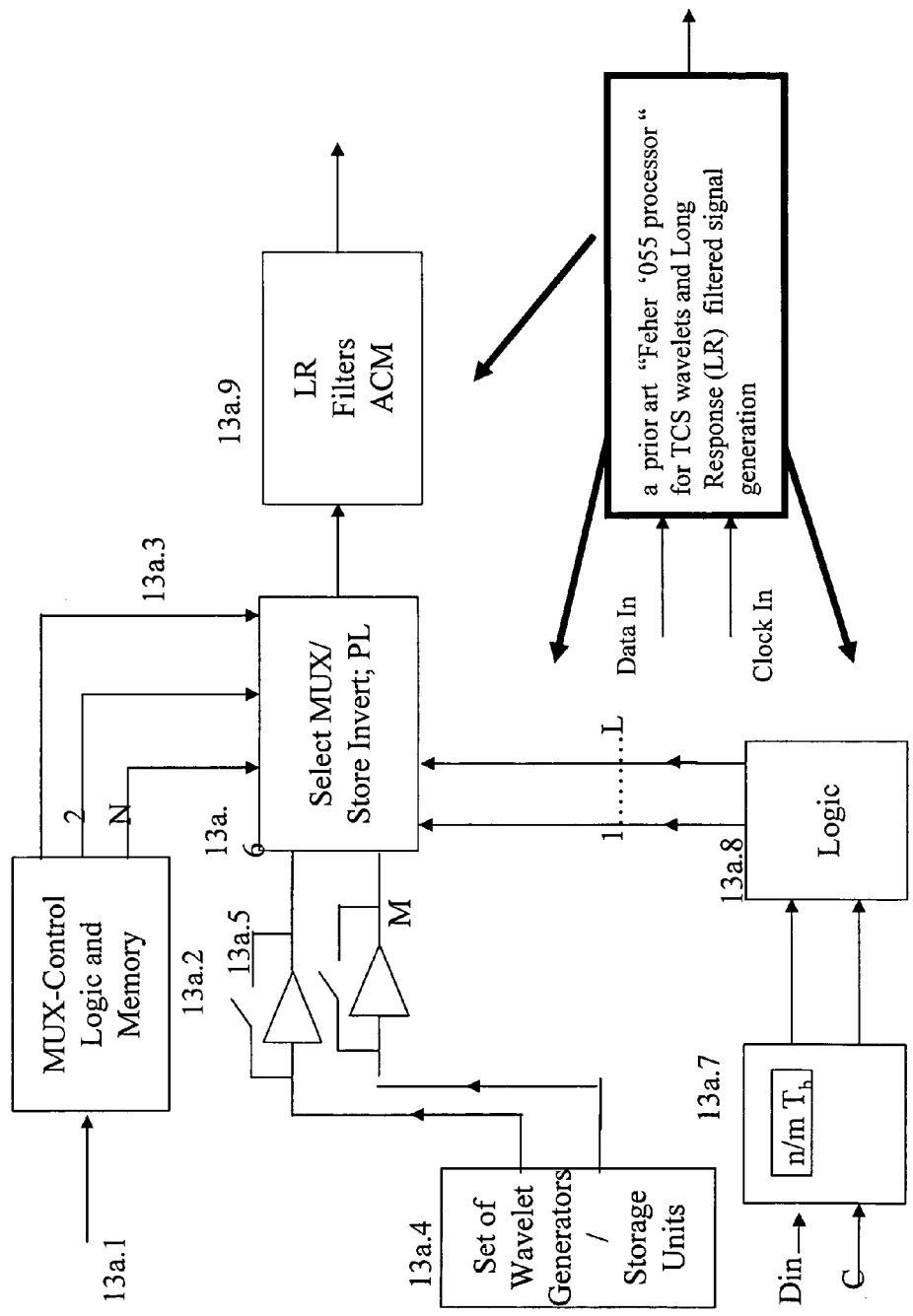
FIG. 1 a prior art Time Constrained Signal (TCS) processor and Long Response(LR) filter or LR processor architecture, also designated herein as a "Feher '055 processor" is illustrated, Ref. [17], Feher's U.S. Pat. No. 6,470,055.

This invention addresses the need for new more efficient embodiments and implementation architectures of reconfigurable, adaptable, interoperable multimode ultra wideband-ultra narrowband(UWN) systems as well as a class of broadband wireless, broadband wireless access (BWA) and other spectral and power efficient communication systems. The BWA systems, disclosed herein include new implementation architectures and new "hybrid" embodiments for WCDMA, WiMAX, Wi-Fi, IEEE 802.11 and other IEEE specified systems. Local Multipoint Distribution Systems, other point to point systems and Multipoint Distribution Services (MDS) will need more efficient, reduced size interoperable Multimode Multiple Input Multiple Output (MMIMO) hybrid operation, disclosed herein.

A network which incorporates UWB and UNB or other combinations of communications and or broadcast systems, is designated here as a "hybrid" system or "hybrid" network. While prior art UWB systems, broadband systems, systems known as IEEE 802 standardized systems, WI-FL and/or Bluetooth provide communications for short distances some of these systems are not efficient for longer range/longer distance applications.

While spectrally efficient, narrowband and Ultra Narrow Band (UNB) systems are suitable for short as well as longer distances there are no disclosed embodiments for cost efficient-simple reconfigurable, interoperable communication and broadcasting system architectures, baseband, intermediate frequency (IF) and radio frequency (RF) implementations for Bit Rate Agile (BRA) systems, Adaptive Modulation and Coding (AMC) in case of UWB and UNB systems and the connection of these systems into an operating network. Processing the data signals, clock signals, and/or carrier waveforms of UWB, of UNB and of a class of other systems leads to shaped radio-frequency (RF) waveforms and wavelets. With Multiple Input Multiple Output (MIMO) diversity and protection system configuration the performance and capacity of these "hybrid" UWB and UNB systems may be further enhanced. For such systems more efficient and simpler architectures and implementations are disclosed.

In prior art patents and in other published documents and articles the aforementioned sets of systems were invented, studied and investigated separately from each other and joint-hybrid efficient and seamless, adaptive Modulation Format Selectable (MFS) and Bit Rate Agile(BRA) operation and joint embodiments of systems which operate as Adaptive Modulation and Coding (AMC) in flexible agile UWB and UNB systems in conjunction with other wireless and wired (cable, telephone, fiber optics) systems such as $2^{nd}$ generation wireless systems, such as GSM systems, CDMA systems, $3^{rd}$ generation cellular systems and $4^{th}$ generation wireless and cellular systems, including broadband systems were not disclosed.

BACKGROUND OF THE INVENTION

One set of communications systems contains highly spectral efficient, narrowband, very narrowband and ultra narrowband (UNB) systems; an other set contains broadband, wideband and ultra wideband (UWB) systems. Combinations and variations of these two sets of systems are designated herein with the generic term/acronym: Ultra wideband-ultra narrowband(UWN) systems.

The most important objectives of wireless communications, broadcasting, telemetry, location based systems GPS (Global Positioning System), Radio Frequency Identification systems (RFID), internet browsing infrared and in general "radio" systems as well as "wired" systems include: power and bandwidth or spectrum efficiency combined with robust Bit Error Rate (BER) performance in a noisy and/or strong interference environment. These Radio Frequency (RF) system objectives are specified in numerous systems including wireless communications and cellular systems, satellite systems, mobile and telemetry systems, broadcasting systems, cable, fiber optics and practically all communication transmission systems. Here we are using the term "Radio Frequency" (RF) in its broadest sense, implying that we are dealing with a modulated signal. The RF could be, for example, as high as the frequency of infrared or fiber optic transmitters; it could be in the GHz range, e.g., between 1 GHz and 300 GHz, or it could be in the MHz range, e.g. between about 1 MHz and 999 MHz or just in the kHz range, such as used in telephony modems. The term RF could apply to Base-Band (BB) signals, to Pulse Position Modulated (PPM) signals, to Quadrature Modulated (for short "QM" or "QMOD") and to FM or AM or hybrid modulated signals, to non-quadrature modulated signals, or to un-modulated Carrier Wave (CW) signals or waveforms.

The cited publications, patents, pending patents and other published documents, reference numbers [1-31], and the references within the aforementioned publications contain definitions and descriptions of many terms used in this new patent disclosure and for this reason these "prior art" terms and definitions will be only briefly, on a case by case basis highlighted.

While the majority of prior patents and publications disclose systems which have a spectral efficiency of less than about 10 b/s/Hz [such systems include GMSK, BPSK,QPSK, QAM (e.g. 16-QAM; 64 QAM), Pulse Width Modulation (PWM), Pulse Position Modulation (PPM) and Pulse Duration Modulation methods] there is prior art which discloses implementations which could attain considerably higher spectral efficiencies, i.e. more than 10 b/s/Hz.

H. R. Walker's patents, references [1-5] and Feher's patent Ref. [16] describe information signal transmission methods which could attain ultra high spectral efficiencies of more than 10 b/s/Hz, designated herein as ultra narrowband(UNB) or ultra spectral efficient systems.

While the aforementioned issued patents and publications describe material of a background nature, they do not describe or suggest the subject matter of the present patent.

Prior to the description of the current invention, a brief review and highlights of prior art, contained in the description of FIG. 1 to FIG. 5 is presented. Some of the embodiments of the current disclosure use the terminology and acronyms and/or related acronyms to the ones used in the prior art and may use as part of the current embodiments acronyms/elements taken from prior art.

FIG. 1 a prior art Time Constrained Signal (TCS) processor and Long Response(LR) filter/or LR processor architecture, also designated herein as a "Feher '055" processor is illustrated. This TCS signal processor or waveform or wavelet architecture processor-generator in combination with LR filtered and or LR processed circuits has been used for agile cascaded mismatched (A CM) systems in Feher's U.S. Pat. No. 6,470,055, Ref. No. [17]. In brief, the term "agile" includes the meanings: flexible or changeable or tunable or selectable. The terms "cascade" and "cascaded" include the meanings: flow, or in series, or in sequence or in conjunction with. In other words cascaded also means that something is arranged in a series or succession of stages; that is each stage derives from or acts upon the product of a preceding stage. The term mismatch has the same meaning as in Feher's U.S. Pat. No. 6,470,055, Ref. No. [17] and Feher's U.S. Patents Ref. No. [18-19]. The Feher '055 processor is a unit, suitable for implementation of one of the elements of Ultra Narrow Band(UNB), Ultra Wide Band(UWB), combinations of Ultra Wide Band-Ultra Narrow Band(UWN) systems and other communications and broadcasting systems for system implementations and /or for Adaptive Modulation and Coding (AMC) system embodiments disclosed in the current invention.

Figure 2:
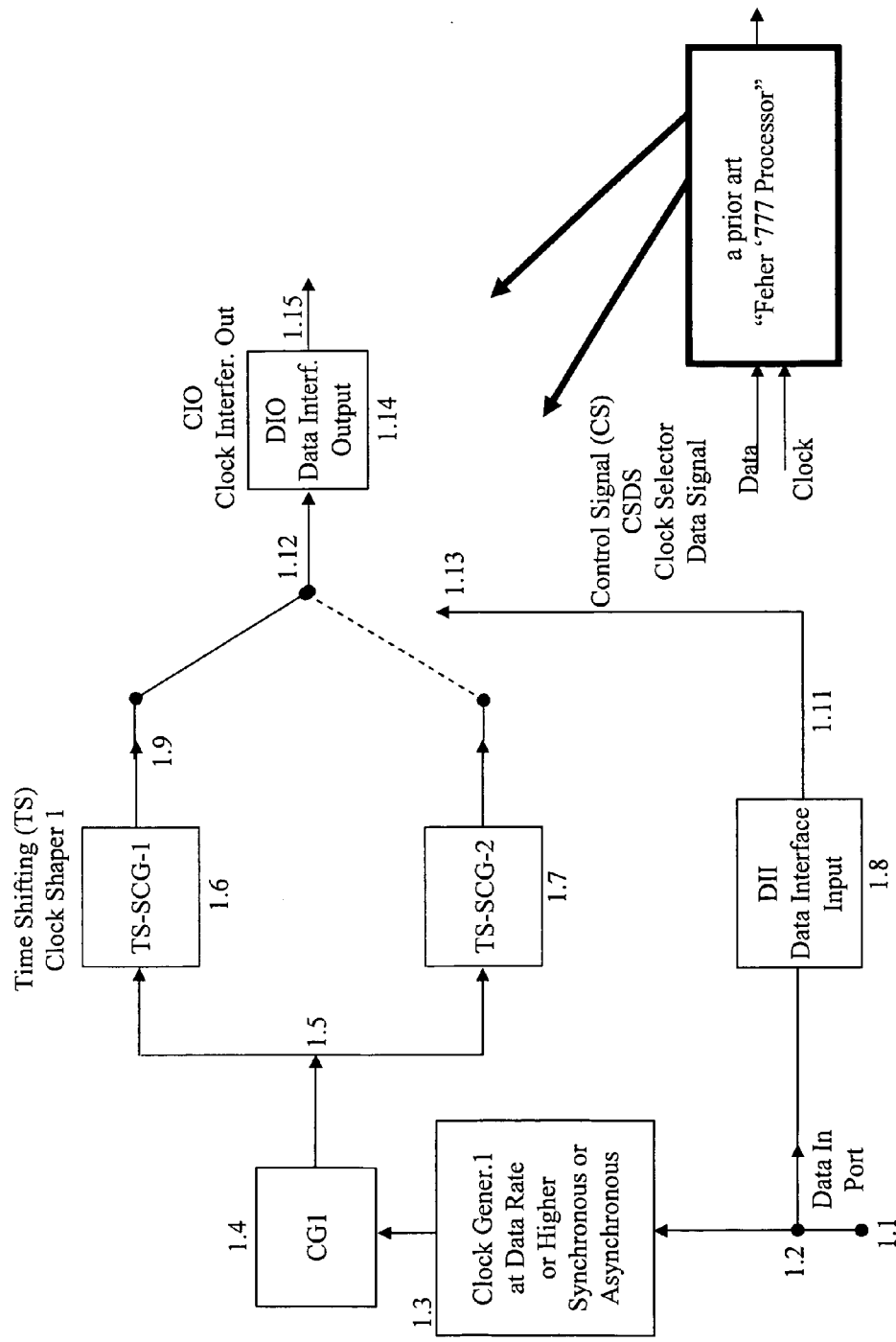
FIG. 2 a prior art implementation of a narrowband system, also designated herein as Ultra Narrow Band (UNB) system, and/or a "Feher '777 processor" is shown, Ref.[16], Feher's U.S. Pat. No. 6,198,777

FIG. 2 a prior art implementation of a narrowband system, also designated herein as ultra narrowband (UNB) system, and/or a Feher '777 processor is shown.

This implementation from Feher's U.S. Pat. No. 6,198, 777, Ref. No. [16] is also designated herein as a Feher '777 processor, Feher Keying (FK) Modulation and Demodulation (modem)-system. It is suitable for implementation of a part of ultra narrowband (UJNB), ultra wideband (UWB) embodiment and combinations of ultra wideband-ultra narrow band (UWN) systems, also designated herein as "hybrid" systems or hybrid networks. The UWN and other hybrid systems, disclosed in the current invention are suitable for Adaptive Modulation and Coding (AMC).

Figure 3:
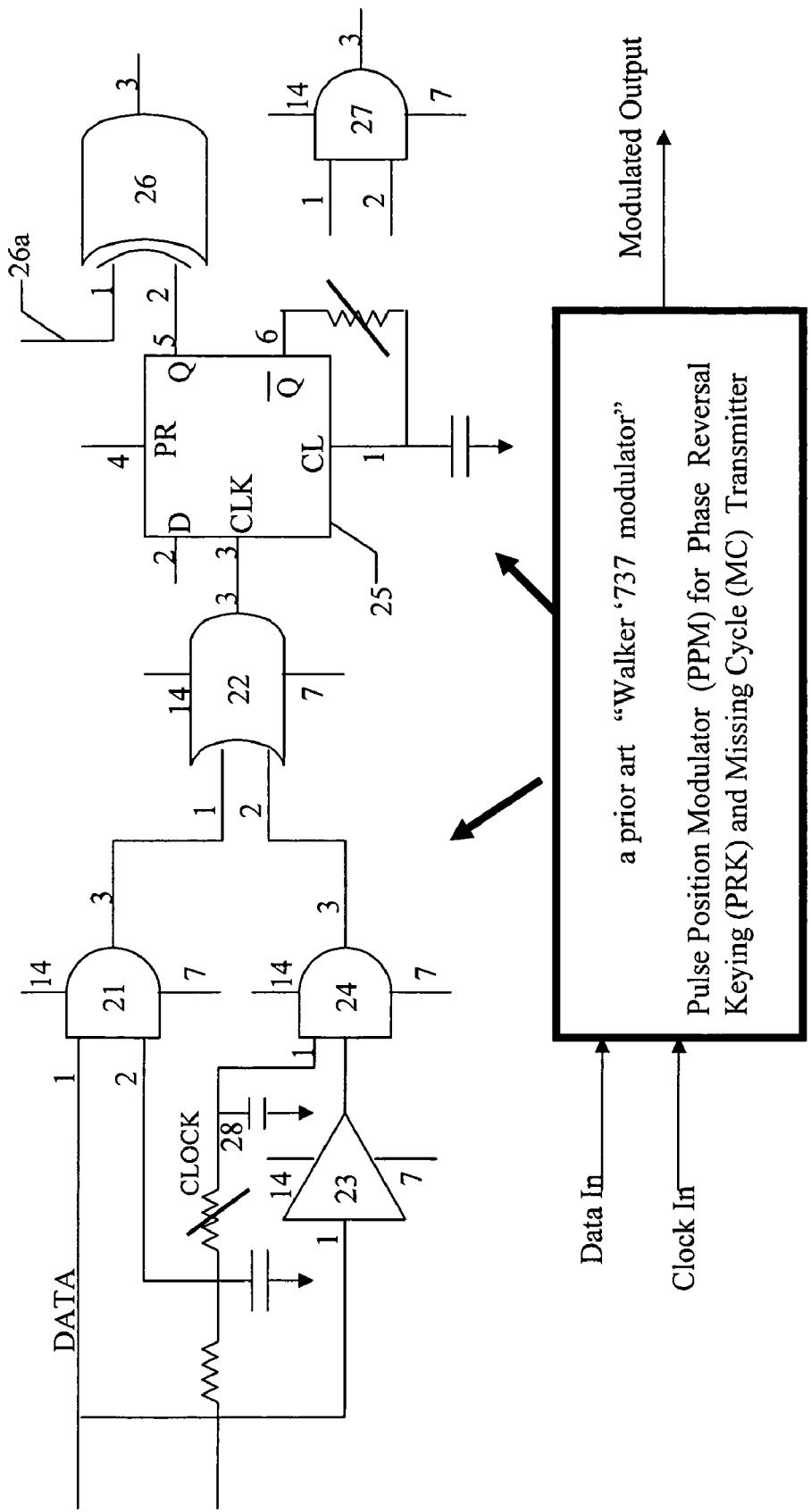
FIG. 3 a prior art "Walker '737 modulator", used for Pulse Position Modulation (PPM), Phase Reversal Keying (PAR) and Missing Cycle (MC) transmission is illustrated, Ref.[1-2], Walker's U.S. Pat. No. 6,445,737

FIG. 3 a prior art Walker '737 modulator, used for Pulse Position Modulation (PPM), Phase Reversal Keying (PAR) and Missing Cycle (MC) transmission is illustrated The Walker '737 Modulator for transmission and reception of ultra narrowband (UNB) signals uses Pulse Position Modulator (PPM) for Phase Reversal Keying (PAR) and Missing Cycle (MC) Signal Transmission; this FIG. 3 is from Walker's U.S. Pat. No. 6,445,737, Ref. No.[1-2].

Figure 4:
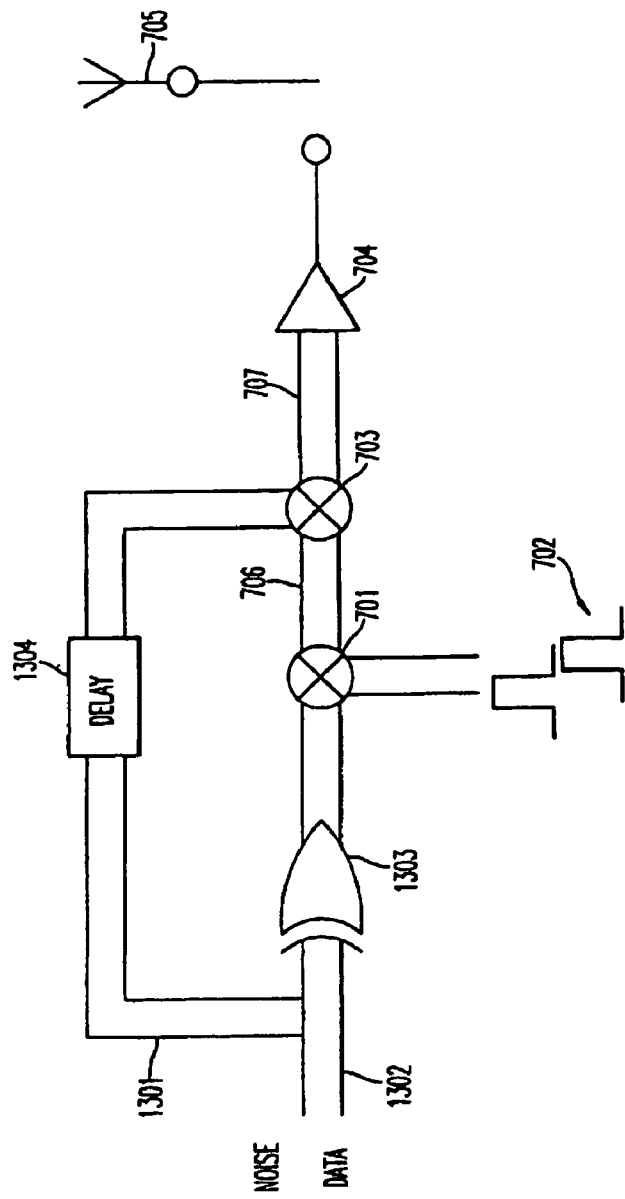
FIG. 4 a prior art "McCorkle '238 transmitter", for Ultra Wide Band(UWB) systems, Ref. No. [15], McCorkle 's U.S. Pat. No. 6,735,238 is shown FIG. 5 a prior art illustrative spectrum, designated herein as Ultra Narrow Band (UNB) Spectrum from Feher's U.S. Pat. No. 6,198,777, Ref. No. [16], is illustrated

FIG. 4 a prior art Ultra Wide Band(UWB) implementation of McCorkle et al., U.S. Pat. No. 6,735,238, Ref. No. [15] is illustrated.

Figure 5:
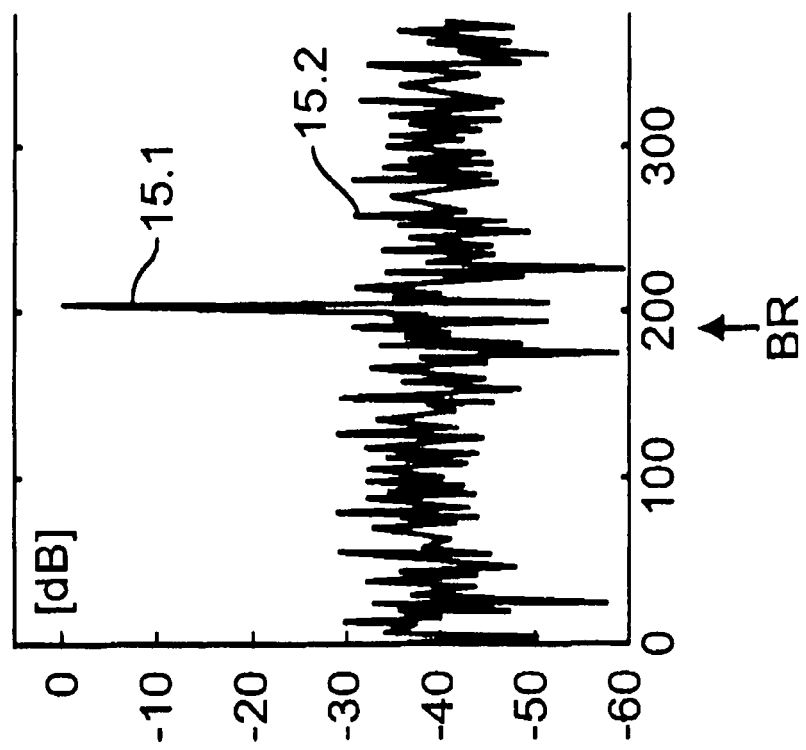

FIG. 5 prior art illustrative spectrum, designated herein as Ultra Narrow Band (UNB) Spectrum, generated by one of the Feher '777 processors, from Feher's U.S. Pat. No 6,198,777, Ref. No. [16], is shown.

SUMMARY OF THE INVENTION

This invention discloses new, efficient embodiments and implementation architectures of reconfigurable, adaptable, interoperable broadband wireless, multimode ultra wideband-ultra narrowband(UWN) systems as well as a class of broadband and other spectral and power efficient communication systems.

A network which incorporates UWB and UNB or other combinations of communications systems is designated here as a "hybrid" system or "hybrid" network.

Processing the data signals, of clock signals, and/or carrier waveforms of UWB, of UNB and of a class of other systems leads to shaped radio-frequency (RF) waveforms and wavelets. Multiple Input Multiple Output (MIMO) diversity and protection system configuration the performance and capacity of these "hybrid" UWB and UNB systems may be further enhanced. For such systems more efficient and simpler architectures and implementations are disclosed.

Specific Objectives of this invention include:

A $1^{st}$ objective of this invention is to disclose implementations and embodiments which shape waveforms, wavelets, symbols, Radio Frequency(RF) cycles of previously disclosed non-shaped signals by means of optional TCS and/or LR processors and filters. Such shaping improves the spectral characteristics and or other performance parameters the system and leads to, in several cases simpler implementation architectures.

A $2^{nd}$ objective is to process and generate UNB and UWB signals which have Modulation Format Selectable (MFS) waveforms or wavelets and are suitable for hybrid operation, diversity and protection systems including a new generation of Adaptive Modulation and Coding (AMC), Multiple Input Multiple Output (MIMO) systems which are interoperable with existing wireless systems, such as cellular GSM, GPRS, EDGE and CDMA and W-CDMA systems as well as with other conventional and broadband wireless and telephony systems.

DETAILED DESCRIPTION OF THE INVENTION AND OF ITS EMBODIMENTS

Detailed disclosure of several implementation architectures and embodiments of the current application is contained in this section.

Figure 6:
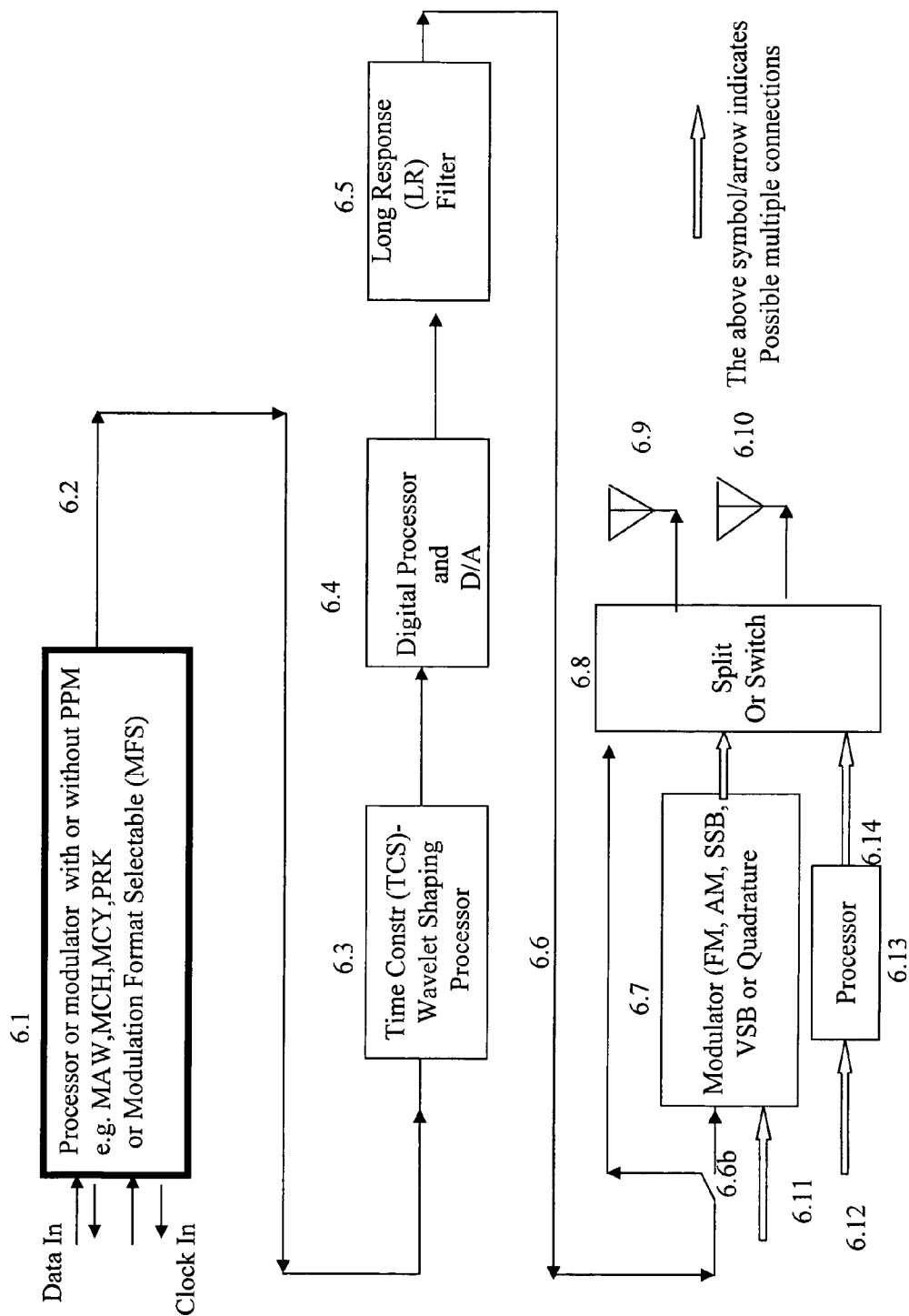
FIG. 6 is an embodiment of the current disclosure of an Ultra Narrow Band(UNB), an Ultra Wideband(UWB) and an efficient architecture containing Modified Amplitude Wavelets(MAW), Missing Chip (MCH), Missing Cycle Modulation(MCYM), Modulation Format Selectable(MFS), Multiple Input Multiple Output (MIMO), Phase Reversal Keying (PAR), Long Response (LR) processed or filtered signals and shaped Time Constrained Signal waveforms (TCS)

FIG. 6 is an embodiment of an Ultra Narrow Band(UNB) architecture, containing in part a processor or modulator, element 6.1. Element 6.1 represents a processor and/or a modulator such as a Missing Cycle(MCY) or Phase Reversal Keying(PAR) modulator (e.g. Walker '737 modulator) which provides by connector 6.2 to the input of Time Constrained Signal(TCS) processing and/or shaping unit 6.3 the processed and/or modulated signal.

One or more Data Input (Data In) and Clock Input (Clock In) signals are provided to or from processor unit 6.1. The flow of Data Input (Data In) and Clock Input (Clock In) signals, depending on the preferred arrangement and application, could be either from the data/clock source unit, also designated as customer interface, not shown in FIG. 6, or towards the customer interface unit.

Processor 6.1 processes the incoming data/clock signals and generates one or more Modified Amplitude Wavelets (MAW), Missing Chip (MCH), Missing Cycle (MCY), Pulse Position Modulation (PPM), Phase Reversal Keying (PAR) signals with optional Modulation Format Selectable (MFS) waveforms or wavelets. Prior art references including Walker's '737 modulators, Ref No.[1-2], Feher's '777 processor, Ref. No.[16], Mohan Ref. No.[6] and McCorkle et al Ref. No.[15] disclose exemplary embodiments for Processor 6.1. The processor 6.1 provides output signals (waveforms, wavelets, symbols, or cycles are alternative terms herein for the term "signal") on single or multiple lead(s) 6.2.

In case if element 6.1 is implemented by a Walker '737 modulator or is implemented by one of the Feher's '777 processors then on connection lead 6.2 there are shaped or not-shaped waveforms. Units 6.3, 6.4 and 6.5 provide additional optional signal shaping and processing functions.

In the current invention the 6.1 processed prior art signals, or other signals, are provided to additional optional signal processing elements shown in FIG. 6. Unit 6.3 shapes the waveform generated in 6.1 and connected on lead 6.2 to processor 6.3. Processor 6.3 is providing a waveform shaping operation in a Time Constrained Signal(TCS) waveform (or wavelet) shaping processor. The processed/shaped TCS waveform output of processor 6.3 is connected to element 6.4 which contains a digital processor and a Digital to Analog (D/A) converter. The 6.4 digital processor may include serial to parallel data conversion or contain digital interface circuitry for suitable D/A interface. The output of the D/A is connected to a Long Response (LR) filter or processor, element 6.5. Since the prior art contains material on D/A converters and also on TCS and LR filters/processors, e.g. Feher's '777 processor, Ref. No. [16] and Feher's '055 processor Ref. No. [17], it would be redundant to describe here embodiments of TCS processors and of LR processors/filters.

In other words Unit 6.3 is a waveform(or wavelet or symbol) shaping element which provides shaped TCS signals to Unit 6.4 which contains a digital processor, or analog processor/filter and/or a Digital to Analog Converter (D/A). The output of Unit 6.4 is connected to Unit 6.5, which is a Long Response(LR) filter or processor (baseband or IF or RF). The output of Unit 6.5 is provided on single or multiple lead 6.6 to optional selector(switch or splitter) 6.6b and to element 6.7 for subsequent modulation and/or to element 6.8 which provides signal splitting or switching or combining. The outputs of element 6.8 are provided to one or more output leads and to one or more antenna units 6.9 and/or 6.10.

The term lead and its alternate term connection lead is interchangeably used in this application. The terms lead and connection lead are interpreted in a broad sense, including: the terms lead and connection lead mean that a connection is provided or there is a connection, or the signal is connected to a device or one or more signals are provided to a transmission medium. The term transmission medium includes the following generic meanings: transmitter port, transmitter interface, amplifier, cable connection, fiber optic interface, telephone line interface and telephone line, antenna, wire or wireless input port.

Processor 6.13 receives signals from input lead(s) 6.12 and provides control signals on lead(s) 6.14 to unit 6.8. The signal outputs of unit 6.8 are provided for Diversity Transmission and or splitting to a main channel and protection channel whereby the transmitted signals are controlled or selected by a control signal on lead(s) 6.12 and processed by element 6.13. The control signal could be obtained from a feedback path from a receiver or generated in the transmitter.

Depending on the application, performance specification and hardware, software or firmware requirements all units 6.1 to 6.14 in the aforementioned description are optional. Operational systems are obtained by "mix and match" selection of some of the elements. For example the embodiment could be limited to connection of Elements 6.3, 6.4, 6.5, 6.7 and 6.9 or other combinations or selections of connected elements.

Figure 7:
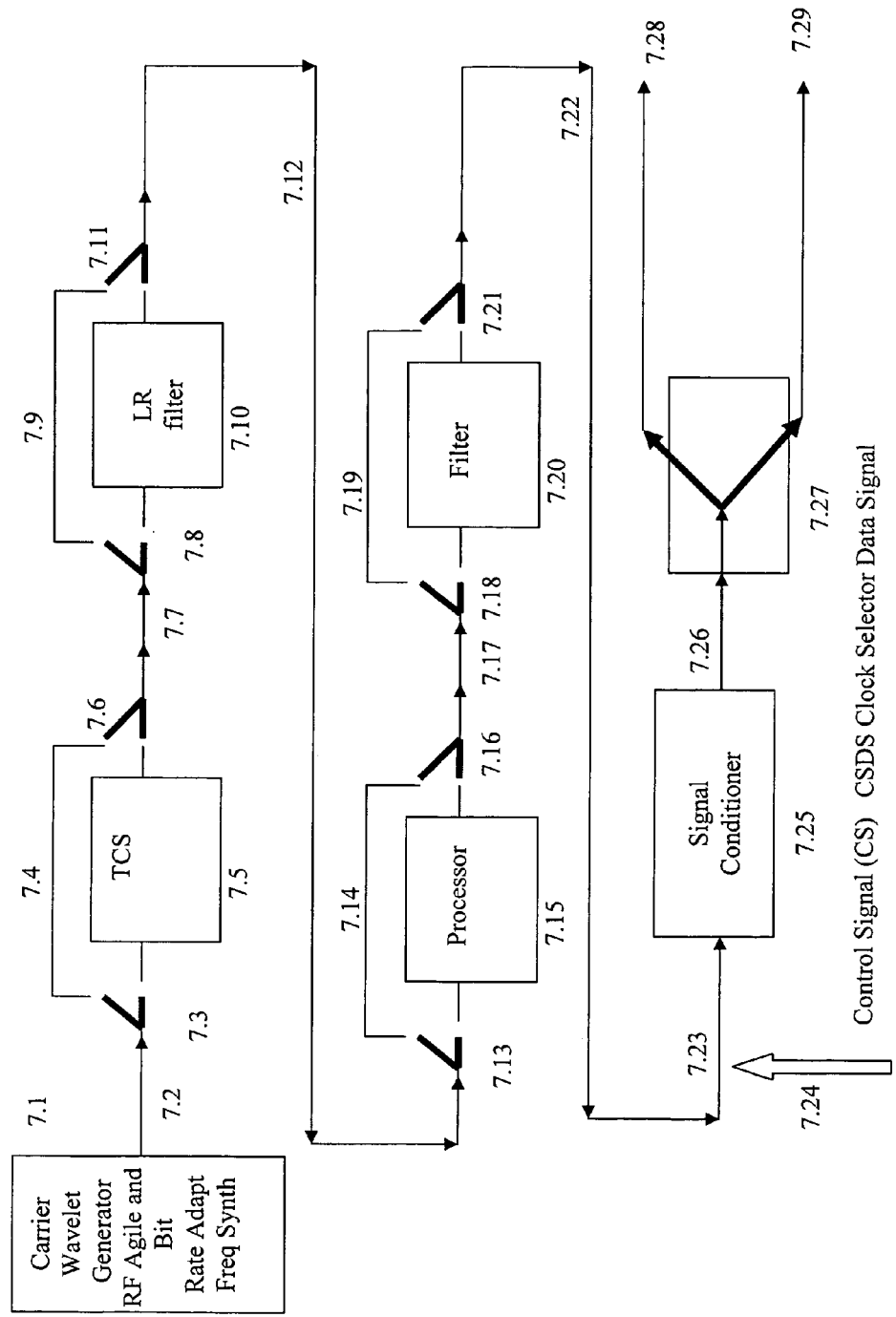
FIG. 7 shows a serial transmitter implementation with optional selected shaped Time Constrained Signal waveforms (TCS) processors and Long Response (LR) processed or filtered signals

Lead 6.6 connects the shaped and processed signal to a waveform/signal modulator. Modulator 6.7 includes one or more conventional prior art modulators, for example FM, GMSK, GFSK, AM, DSB-AM, DSB-TC-AM DSB-SC-AM, BPSK, PPM, PAM, PWM, or Quadrature modulator such as QAM, QPSK, QPRS, 8-PSK or other. Modulated output(s) of element 6.7 is(are) provided to a splitter and/or switch unit 6.8 which provides the signal to one output, two outputs or more than two outputs, illustrated by antennas no 6.9 and 6.10. The split or switched multiple outputs of element 6.8 provide Multiple inputs to antennas 6.9 and 6.10. The FIG. 6 embodiment represents a Multiple Input Multiple Output(MIMO) transmitter, a transmitter which could have between 1 and N (where N is an integer number) inputs and/or between 1 and M (where M is an integer number) outputs and instead of antennas interface units for wired systems may be used. Splitter and/or switch element 6.8 provides signal splitting or selection into one or more transmit branches, illustrated by antennas 6.9 and 6.10. Instead of multiple antennas and multiple branches in some applications a single antenna or single interface transmit unit is used. Antennas 6.9 and 6.10 may be replaced with interface connections to wired systems. Lead(s) 6.11 and 6.12 are control leads provided to elements 6.7 and 6.13 respectively. These control leads provide signals for 6.7 modulator control/selection and for selection of 6.13 processor parameters for signal switch selection and/or for signal splitting. The control signals may be obtained from the receiver—via an information line or are generated in the transmitter for adaptive multi-mode signal selections. In FIG. 7, as well in other figures, the arrows—illustrated with two parallel lines, indicate that there could be one or more than one signals in the signal path.

FIG. 7 illustrates a serial transmitter implementation of the current invention. Unit 7.1 contains one or more of the following elements: A carrier wavelet (or carrier waveform or carrier cycle) generator, and/or one or more RF agile and Bit Rate Adaptive or Bit Rate Agile(BRA) (also designated as tunable or selectable bit rate) Frequency Synthesizer. The output signal or output signals of unit 7.1 are connected by lead 7.2 to a switch or selector 7.3. The selected signal is (in the upper position of selector switches 7.3 and 7.6) by-passing unit 7.5, designated as Time Constrained Signal (TCS) processor unit 7.5. In the lower position of switches 7.3 and 7.6 the signal on lead 7.2 is connected through TCS unit 7.5 to lead 7.7 and to switch 7.8. Depending on the position of switches 7.8, 7.11, 7.13, 7.16, 7.18, and 7.21 the signal path is by-passing element 7.10 (long response LR filter or processor ), 7.15 processor, 7.19 filter if the aforementioned switches are in the upper positions and passing through the said elements if the switched are in the lower positions. Combinations of upper and lower optional switch positions and optional elements are implemented by this diagram.

Leads 7.2, 7.7, 7.12, 7.17, 7.22 continuing into 7.23, 7.26, 7.28 and 7.29 provide the signals to the next step of the transmitter and/or connect the signals to the transmission system. Optional signal conditioner 7.25 and splitter or combiner or switch unit 7.27 provide the signal(s) to output lead/output interface units 7.28 and 7.29. Control signal(s) (CS) or Clock Selector Data Signals (CSDS) are provided on leads 7.24. Leads 7.24 are connected to one or more of the aforementioned units/elements, including generators, processors, filters, switches, splitters and or combiners.

Figure 8:
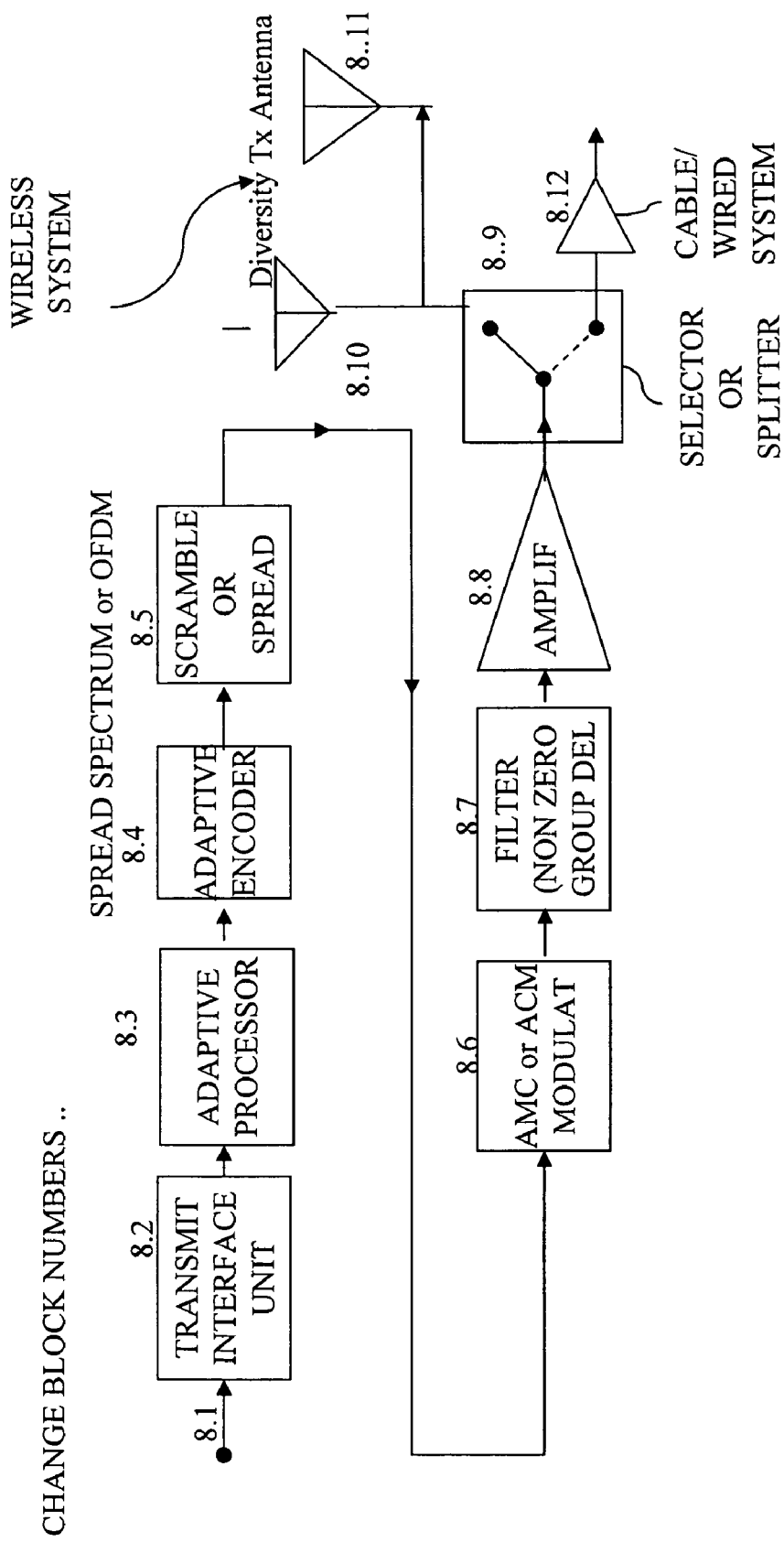
FIG. 8 is an Adaptive Modulation and Coding (AMC) also designated as Adaptive Coded Modulation(A CM) Diversity-Multiple Output spread-spectrum and/or non spread spectrum transmitter

FIG. 8 is an other transmitter implementation of the current invention. The shown embodiment is for Adaptive Modulation and Coding(AMC), also designated as Adaptive Coding and Modulation(A CM), with or without diversity or protection switching, multiple input multiple output(MIMO) spread spectrum and non spread spectrum systems.

Lead 8.1 signal connections (leads) provide and/or receive the input data and/or clock signals to/from the transmit interface unit 8.2. One or more than one, multiple input signals are present on lead 8.1 and received by the subsequent units and are processed for transmission as single signals or more than one, multiple output signals. The interface unit 8.2 provides signals to one or more of the following optional units. Processor 8.3. is processing the input data and/or clock signals. The processed signals are provided to adaptive encoder 8.4, scrambler and/or spreader 8.5, AMC modulator 8.6, filter 8.7, amplifier 8.8, selector or splitter 8.9 and depending on the position of selector or splitter unit 8.9 to one or more transmit antennas, units 8.10 and 8.11 or to an interface unit or amplifier unit 8.12 for cabled or wired systems transmission or infrared or other transmission. Encoder 8.4, includes channel coding devices and error control, error detection and /or error correction devices.

Scrambler and/or spreader unit 8.5, includes optional encryptography—for security devices and or spreading functions for spread spectrum systems such as CDMA, W-CDMA and or frequency hopped spread spectrum(FH-SS) systems or other Direct Spread-Spread Spectrum Systems(DS-SS) or Collision Sense Multiple Access(CSMA) systems.

Figure 9:
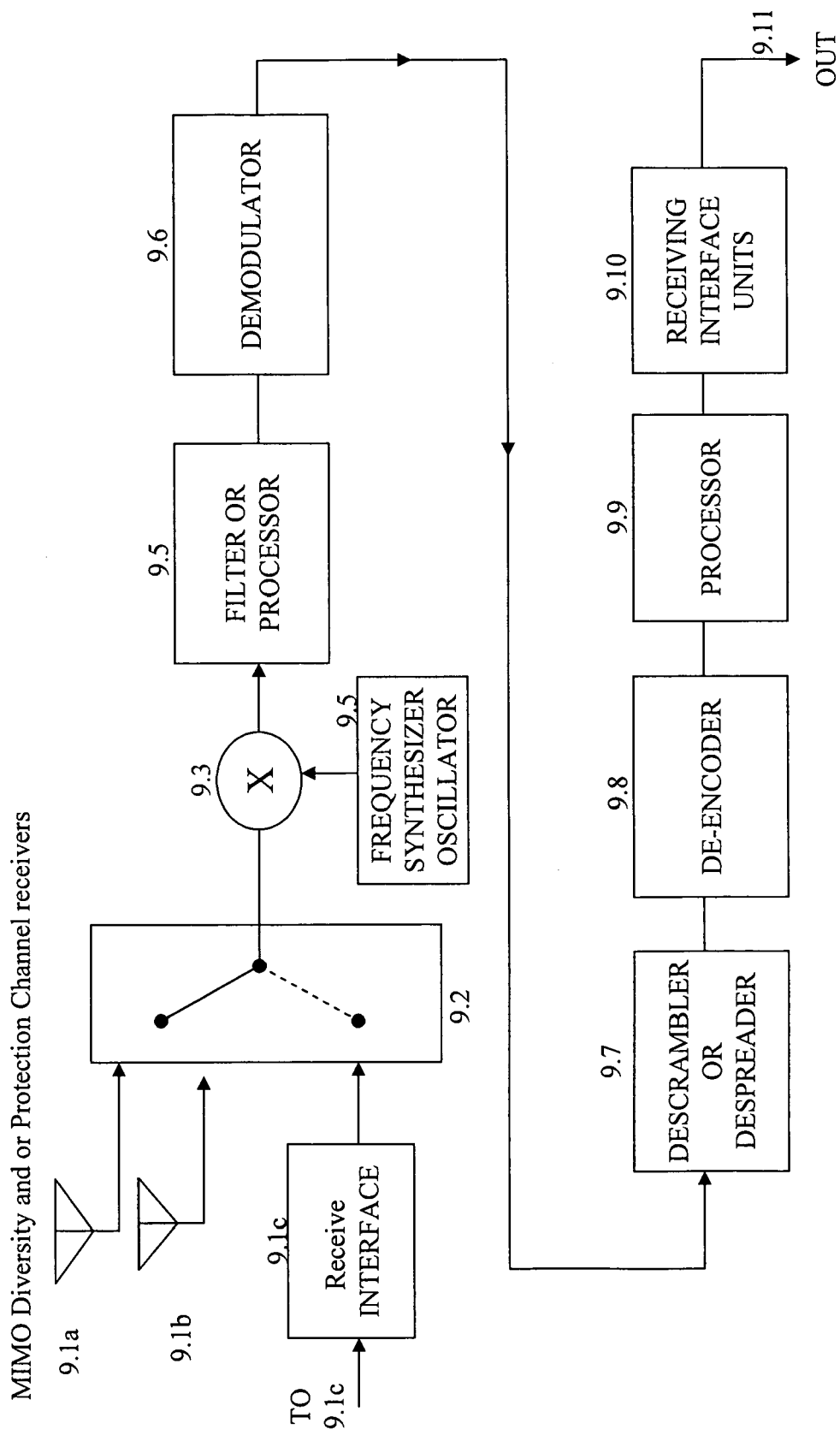
FIG. 9 represents the receiver section of a Multiple Input Multiple Output (MIMO) transmission/reception system with inputs from wired or wireless systems

FIG. 9 represents a receiver embodiment of the current invention; a section of a Multiple Input Multiple Output (MIMO) transmission and reception system with inputs from wireless and from other systems is shown. Receive antennas 9.1$a$ and 9.1$b$ receive the transmitted radio frequency (RF) signals, while interface unit 9.1$c$ and connection lead 9.1$c$ receive the signals from a transmitter. Unit 9.2 is a combiner or switch selector unit which combines or selects one or more of the received signals. The combined or selected signals are provided to multiplier 9.3 for down conversion to an intermediate frequency (IF), or direct down conversion to baseband frequencies. The down-converter (multiplier 9.3) receives a signal from frequency synthesizer or oscillator unit 9.5. The frequency of the frequency synthesizer or oscillator unit 9.5 may be in synchronism—locked to a modulated frequency of the received signal or maybe free running (asynchronous). Unit 9.5 is a filter or signal processor; this unit could be implemented at an IF frequency or in baseband, with non-ideal delay and non-ideal group delay characteristics or with approximately constant group delay or approximately zero group delay. The approximately zero group delay or approximately zero delay refers to a single frequency or to a specific frequency band and/or range of frequencies. Unit 9.6 provides additional optional signal filtering or processing, demodulation, synchronization and data regeneration or data reconstruction. Unit 9.7 descrambler or de-spreader descrambles and or de-spreads the signal. Unit 9.8 is a de-encoder; it de-encodes the encoded signal. Unit 9.9 provides additional signal processing, or signal conditioning and provides the processed signals to the receiving interface unit 9.10 and to one or more signal or one or more clock leads 9.11.

Figure 10:
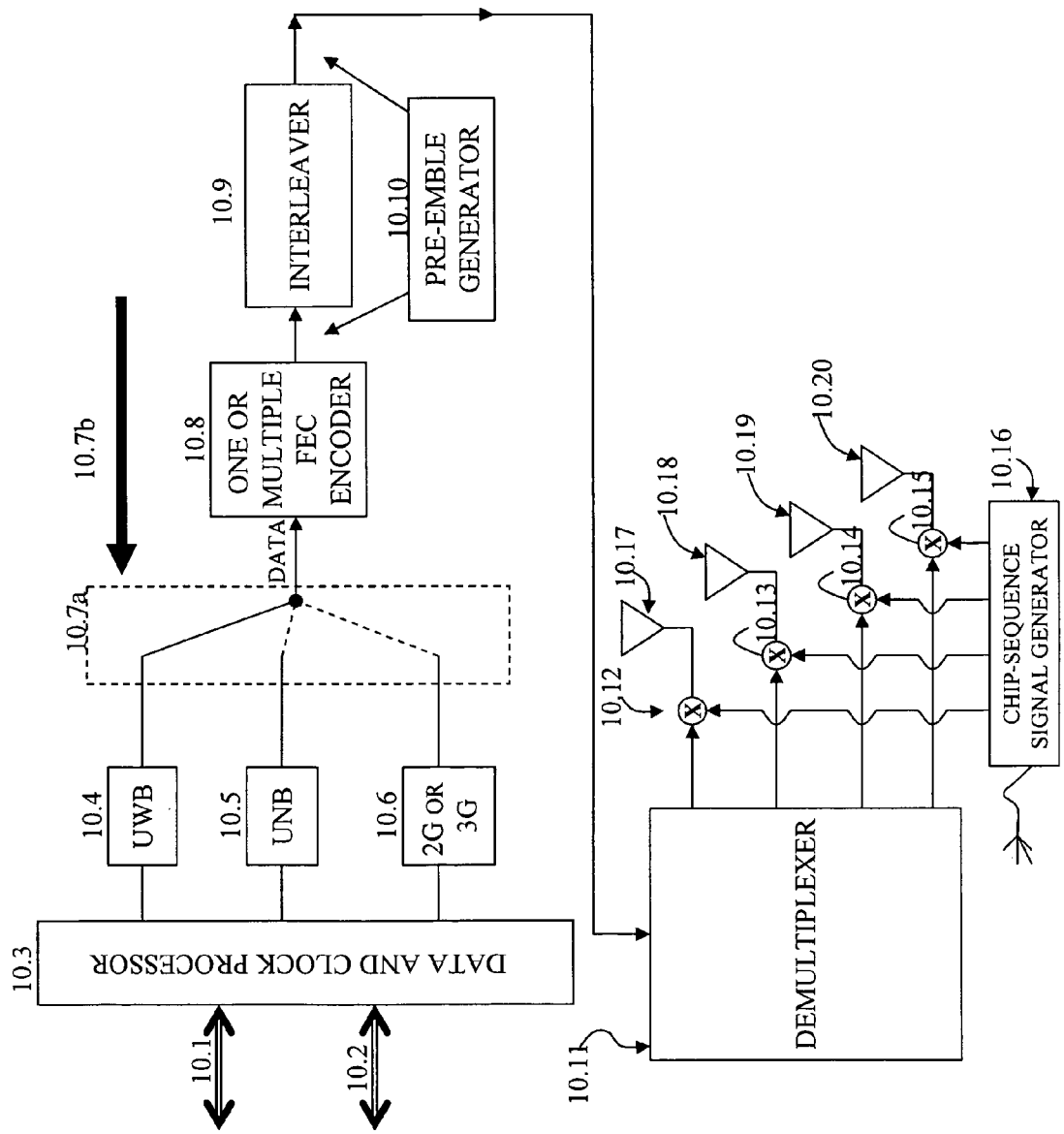
FIG. 10 is a multimode Multiple Input Multiple Output (MIMO) interoperable UWB, UNB and efficient transmitter system with 2$^{nd}$ generation(2G), 3$^{rd}$ generation(3G) and 4$^{th}$ generation(4G) cellular systems

FIG. 10 shows an alternate transmitter embodiment of Multimode Multiple Input Multiple Output (MMIMO) systems of the current invention. FIG. 10 includes embodiment of a multimode MIMO interoperable Ultra Wideband (UWB), Ultra Narrow Band(UNB ) transmitter system with $2^{nd}$ generation (2G), $3^{rd}$ generation (3G) and $4^{th}$ generation (4G) cellular and other wireless and non wireless systems.

This implementation shows structures for a combination of adaptive and other selections of multi-mode, multi-format, multiple rate systems, operated in a single mode or multiple-mode, or hybrid modes. While the combinations and use of the elements in FIG. 10 are new, FIG. 10 contains elements from the prior art and in particular from Schilling's U.S. Pat. 6,128,330, designated, listed also as reference number[13]. In addition to the prior art referenced units, the new units include 10.1, 10.4, 10.5, 10.6 and 10.7 and the combinations of these elements and interactions among them which enable a new generation of broadband, UWB, UNB and 2G or 3G or even 4G systems to operate with new structures. One of the novelties and counter-intuitive inventions of this disclosure and benefits of this application are in the hybrid adaptable-reconfigurable and "mix and match" blocks of FIG. 10. An example is the use of one or multiple ultra narrow band(UNB) processed and/or modulated signals in a spread spectrum mode. In such a hybrid UNB and spread spectrum structure the UNB processor first generates an UNB signal and afterwards one or more of the ultra narrow band signals is spread to a much wider band spread spectrum system in a Multimode Multiple Input Multiple Output (MMIMO) system structure. With such an architecture a higher spreading factor and higher performance is attainable than with prior art spread spectrum systems. Some of the other original discoveries and inventions of this disclosure are in the fact that the combinations of the structures shown in FIG. 10 process and generate spread spectrum, e.g. CDMA signals from 2G systems such as GSM or other TDMA modulated signals and spread the GSM or TDMA signals in one or more spreaders in an optional MMIMO structure. The disclosed multi-mode operation leads to seamless connectivity among different systems, among systems operated at different bit rates, having different modulation formats and different coding rules. On leads 10.1 and 10.2 the single or multiple signals and clocks are provided to or from the data and clock processor, Unit 10.3. Unit 10.4 contains a broadband and/or an UWB processor; unit 10.5 an UNB processor; Unit 10.6 a 2G, 3G or 4G processor. The 2G processor contains a GSM processor generator and or GSM/GPRS combined with EDGE and/or other processors. The processor designated as 3G contains part of a Universal Mobile Telecommunication System (UMTS) processor. Unit 10.7*a* selects or combines the signals and provides them to one or more optional Forward Error Correction Coder (FEC) or other error control coding or error detection encoder(s), Unit 10.8. The signal selection or signal combination of unit 10.7*a* is directed/controlled by one or more control signals provided on leads 10.7*b*. The said control signals are programmed, user selected or operator selected signals, or obtained from the corresponding receivers. The encoded signal is connected to interleaver 10.9 and a pre-amble generator or pre-amble processor. Unit 10.10 provides additional data. The optional de-multiplexer, Unit 10.11 provides de-multiplexed signals to spreaders 10.12, 10.13, 10.14 and 10.15. A chip sequence generator provides one or more chip sequences to the aforementioned spreaders. The spread signals are provided to antennas 10.17, 10.18, 10.19 and 10.20. One or more of the spread signals are selected for transmission.

The embodiments and structures of FIG. 10 provide a large combination of hybrid "mix and match" of multiple mode interoperable systems including interoperable broadband, spread spectrum or non-spread spectrum systems, UMTS, UWB, UNB and of other communications, telemetry, broadcasting, broadband wireless, location finder and Radio Frequency Identification (RFID) systems.

Figure 11:
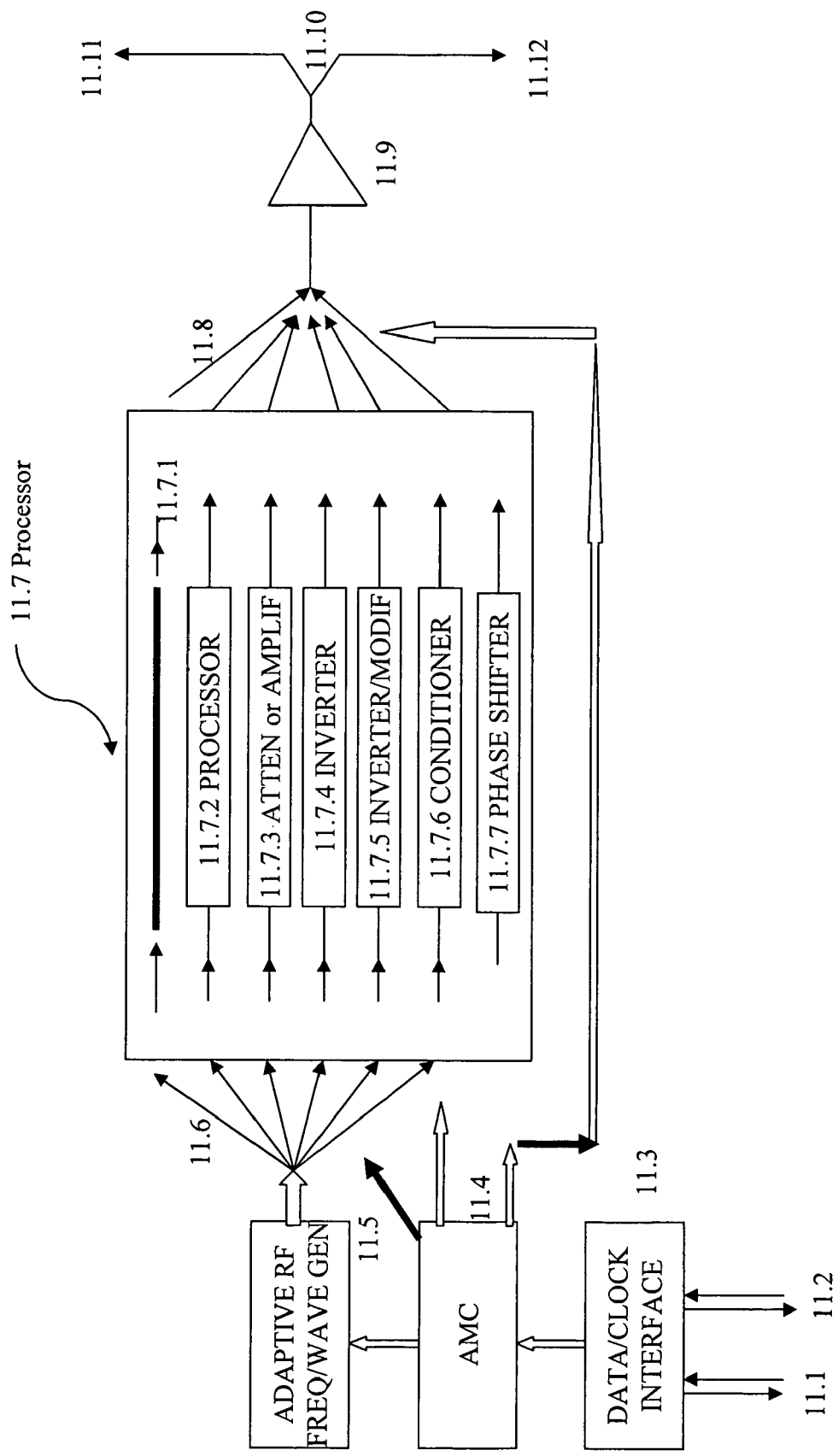
FIG. 11 represents a parallel multimode and optional multiprocessor, multiple modulator reconfigurable transmitter architecture with Multiple Input Multiple Output (MIMO) capability
Figure 16:
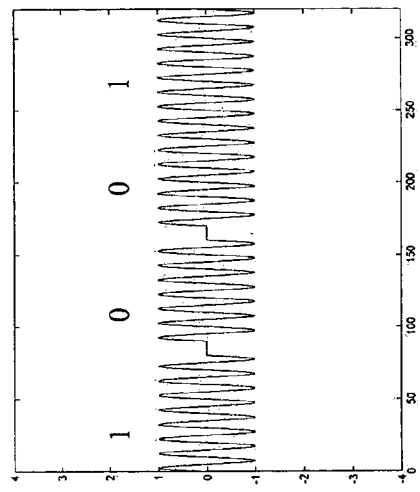
FIG. 16 presents a 1$^{st}$ set of sample waveforms, including NRZ 1001 non-balanced and balanced data patterns, Missing Cycle Modulation 1:8 modulated signals and Phase Reversal Keying (PAR) with 8 cycles per bit
Figure 16:
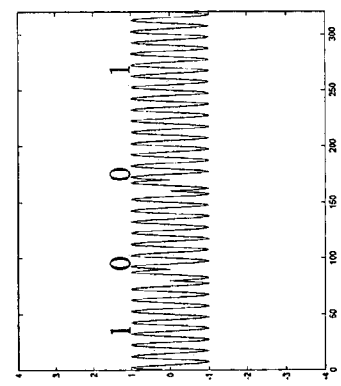
Figure 16:
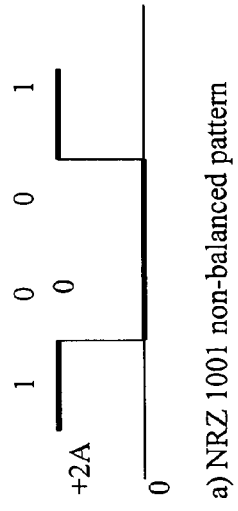
Figure 16:
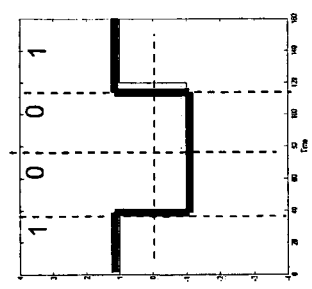
Figure 18:
FIG. 18 illustrates a 3$^{rd}$ set of sample waveforms a) having 4 cycles per bit with reduced amplitudes for zero(0) states; b) Single cycle per bit with zero transmit value for zero signal states ; c) Single cycle per bit with one waveform transmission for the 0 state and an other waveform for the one state
Figure 18:
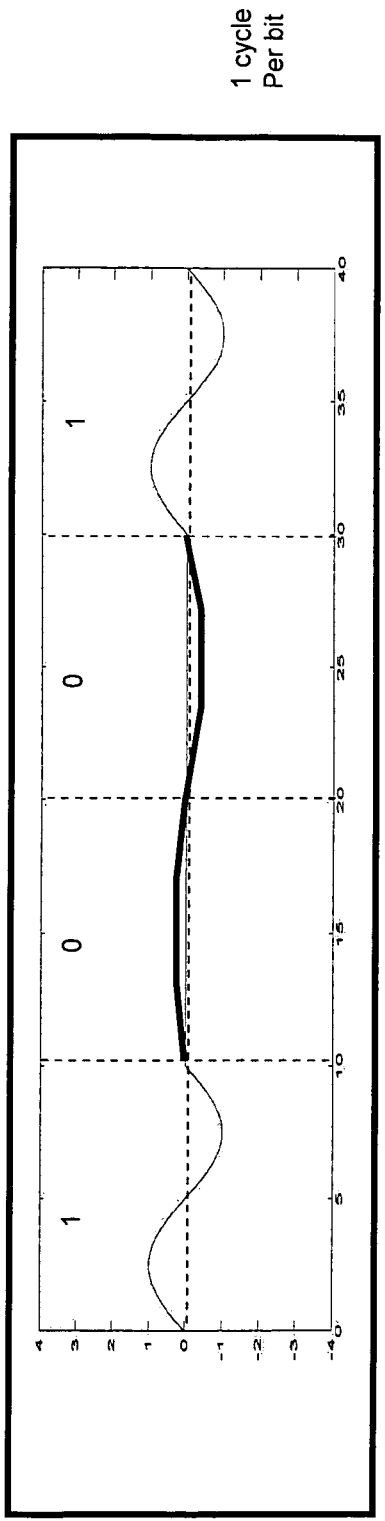

FIG. 11 is an embodiment of a parallel hybrid "mix and match" transmitter architecture for Multimode Multiple Input Multiple Output (MMIMO) and Multiple Input Multiple Output (MIMO) systems of the current invention. On leads 11.1 and 11.2 one or multiple data and/or clock signals are provided to or from Data/Clock Interface unit 11.3. The Data/Clock Interface unit 11.3 processes the data and or clock signals. Clock processing includes processing of the clock rate of the data signal to generate clock rates which are the same and or are different then the clock rate of the input data. The clock rate of the input data is designated as the Clock rate or Clock of the data "CLD" signal. Within unit 11.3 clock rates which are integer multiples, sub-integer multiples or fractions of the data rate are generated. These selectable bit rates are designated as Clock Rates or Clock of the Control Data "CLC" signals. The CLC rates are in some embodiments integer multiples, sub-integer multiples or fractions of the data rate clock CLD, while in other embodiments the CLC rates are "not related" to the CLD rate; here the term "not related" to refers to a CLC rate which is not derived from the CLD signal, that is, it is in a free running operation and or asynchronous with the CLD rate. In some exemplary embodiments the CLD rate equals the CLC rate, while in other embodiments the CLC rate is four(4) times, or eight(8) times or, one thousand (1000) times, or seven and one third (7 and ⅓) times higher than the CLD rate or it is a fraction of the CLD rate. The CLC and CLD signals are provided through Unit 11.4 the Adaptive Modulation and Coding (AMC) unit, as processed control signals to control the operation and signal selection of units 11.5, 11.6, 11.7, 11.8, 11.9 and 11.10. Unit 11.4 is an Adaptive Modulation and Coding (AMC) unit; this unit is also designated as Adaptive Coding and Modulation (A CM) unit. Unit 11.4 processes received signals from Unit 11.3 and provides them to the Adaptive RF frequency and wave generation unit 11.5 and to processor unit 11.7. The outputs of the AMC contain data signals, control signals, clock signals and other signals (e.g. overhead signals/bits, pre-amble signals, known also as preamble bits or preamble words, signal quality monitor signals bits or chips). Adaptive RF frequency and wave generation unit 11.5 provides RF frequency agile or flexible RF waveforms to leads 11.6. One or multiple leads 11.6 are connected to processor unit 11.7. Within unit 11.7 under the control of the AMC, unit 11.4 processed and/or generated signals and/or under the control of the CLD rate or CLC rate clocks, one or more than one (one or multiple) signals are connected and/or processed and connected to leads 11.8. Selection or combinations of Leads 11.6 and 11.8 are controlled by the output signal or output signals of unit 11.4 the AMC processor. Element 11.7.1 represents a connection between the input and output of processor 11.7. Element 11.7.2 is a digital and or analog signal processor or filter or a hybrid processor and filter which provides signal processing, shaping or filtering functions. Element 11.7.3 is an attenuator or amplifier, or unit gain connector which changes (modifies) the amplitude of the incoming signal and provides an amplitude modified output. Element 11.7.4 is a signal inverter; Element 11.7.5 is a signal inverter and amplitude modification device; Element 11.7.6 is a signal conditioner and or filter. This signal conditioner and/or filter element includes optional phase shifters, time delays and or switch components. The switch component of element 11.7.6 connects or disconnects(disables) the signal path between the input and output ports of element 11.7.6. If in a particular time (e.g. during a specific bit duration or a fraction or multiple bit durations) the said switch component is in one of its positions designated as ON, then the signal is forwarded to the output port, while for the other position of the switch designated as OF, the signal between input and output of element 11.7.6 is not connected. The AMC, Unit 11.4 provided control signals select or combine one or more of the unit 11.7 processed signals, processed by one or more of the aforementioned elements of unit 11.7, and provides these processed signals, through the selected leads 11.8 for subsequent amplification in unit 11.9 antenna selection or splitting combining in selector or splitter unit 11.10. One or multiple antennas, illustrated by units 11.11 and 11.12 are used for signal transmission. In an illustrative embodiment of FIG. 11 the RF frequency generator, unit 11.5 provides an un-modulated carrier wave (CW) signal to processor unit 11.7. One or more control signals, generated in the AMC unit 11.4 select for one multiple RF cycles attenuator element 11.7.3, while for other RF cycles a unit 11.7.2 processed RF cycle is selected. In an other illustrative embodiment of this invention, for each data signal (data bit or data symbol) representing a one (1) state four (4) RF cycles are provided through element 11.7.1 and a selected lead 11.8 to the transmit amplifier 11.9, while for each data signal representing a zero (0) state four (4) attenuated waveforms, also designated as wavelets, or in this case RF cycles are provided through element 11.7.3 and a selected lead 11.8 to the transmit amplifier 11.9. An illustration of the resultant 4 cycles per bit waveforms with modified amplitude zero state signal is shown in FIG. 18 and in particular in FIG. 18*a*; we designate such signals as Modified Amplitude Wavelets (MAW) and the process as Modified Amplitude Wavelet Modulation (MAWM). In an other embodiment of this invention, for each data signal (data bit or data symbol) representing a one (1) state one(1) RF cycle is provided through element 11.7.1 to the transmit amplifier 11.9, while for each data signal representing a zero (0) state one (1) RF cycle is disconnected, that is in element 11.7.6 it is not connected to transmit amplifier 11.9. This case is referred to as Missing Cycle Modulation (MCM); the MCM has Missing Cycles (MCY) and or Missing Chips (MCH), i.e. not transmitted cycles (disconnected cycles or disconnected fractions of cycles) in the transmitted signals. In FIG. 16 and in particular in FIG. 16*c* a Missing Cycle Modulated (MCM) signal pattern for a sample data pattern of 1001 bits is shown, with 1 missing cycle from 8 cycles for zero state signals and no missing cycles for 1 state signals. This modulation format is designated as missing cycle 1:8 modulation or MCY 1:8.

In an other embodiment of this invention, for each data signal (data bit or data symbol) representing a one (1) state eight (8) RF cycles are provided through element 11.7.1 to the transmit amplifier 11.9, while for each data signal representing a zero (0) state one out of eight RF cycles has its output phase inverted (relative to the input phase), or has its phase modified (relative to the input phase); these phase inversion or phase reversal and phase modification processes are implemented in element 11.7.5. These cases are designated as Phase Reversal Keying(PAR) and Phase Modification Keying (PMK) respectively. Illustrative examples of Phase Reversal Keying(PAR) modulated signals are shown in FIG. 16*d* for a PAR modulated output signal a 1001 input data pattern with 1 out of 8 cycles having reversed phase for state zero(0) inputs, while for state one(1) inputs there are no phase reversals. The signal shown in FIG. 16*d* is designated as a Phase Reversal Keying(PAR) signal with 1:8 reversals, or PAR 1:8.

Figure 12:
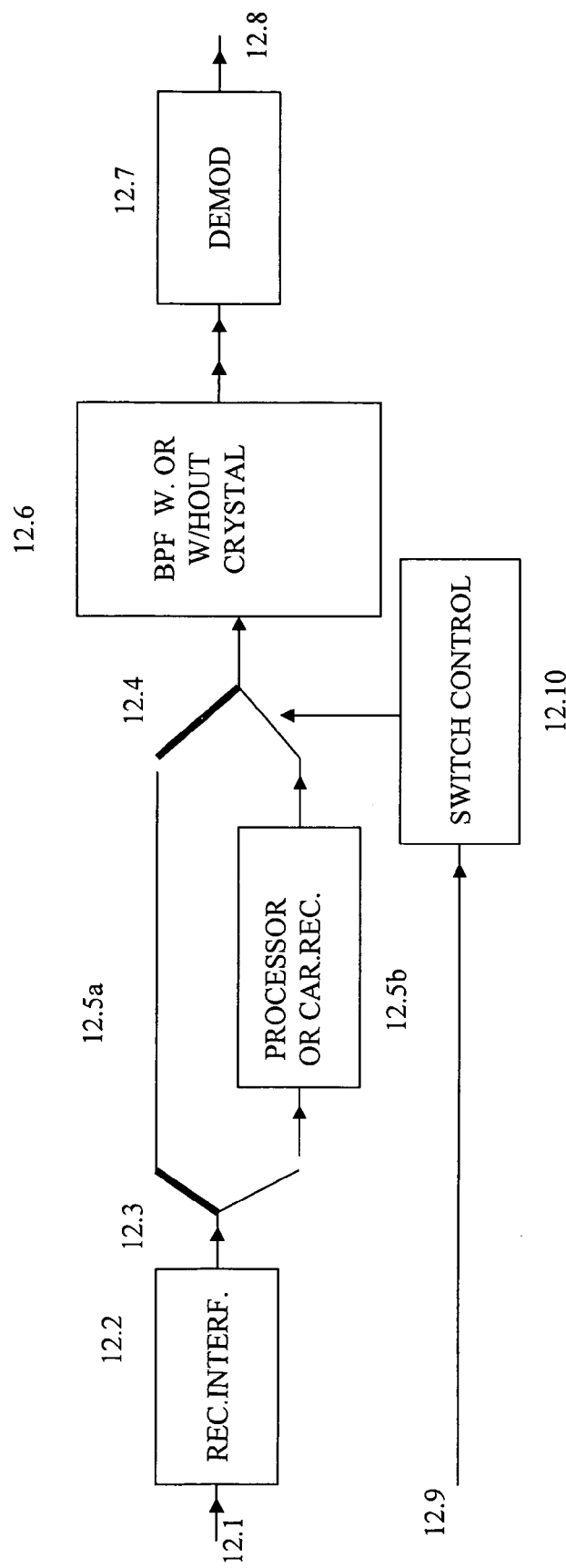
FIG. 12 shows receiver embodiments with and without crystal filters
Figure 14:
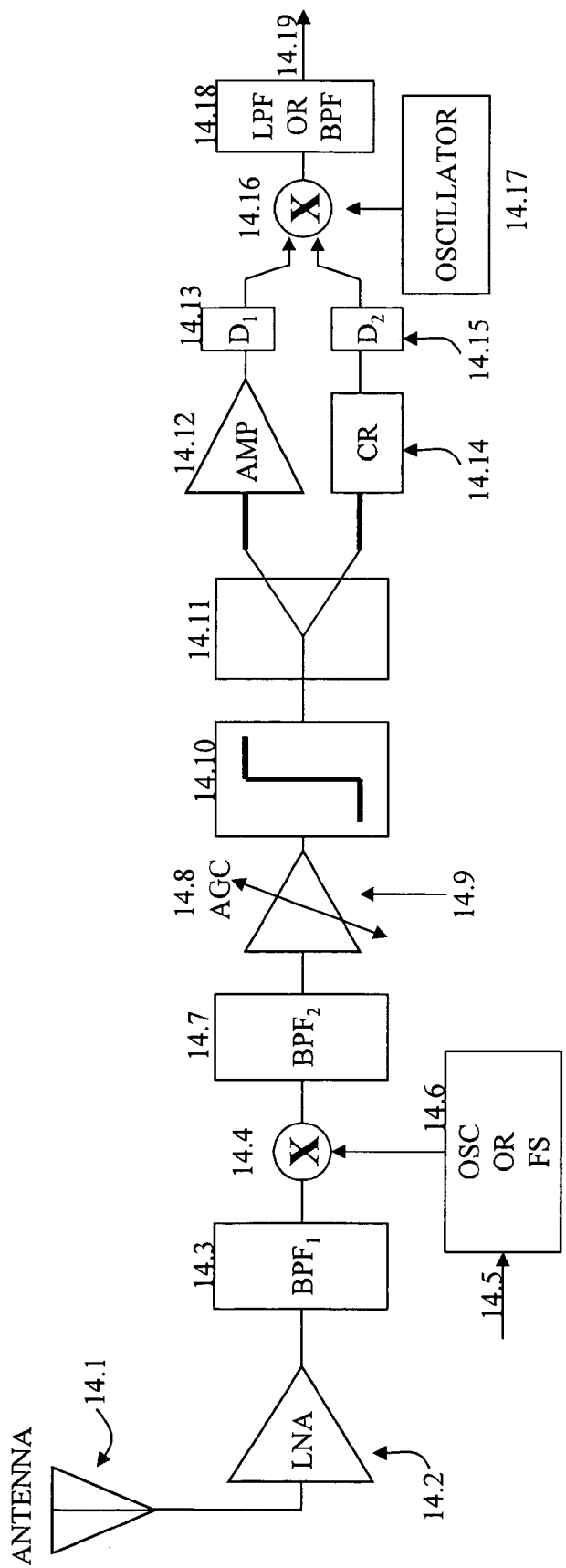
FIG. 14 represents an alternative receiver architecture
Figure 15:
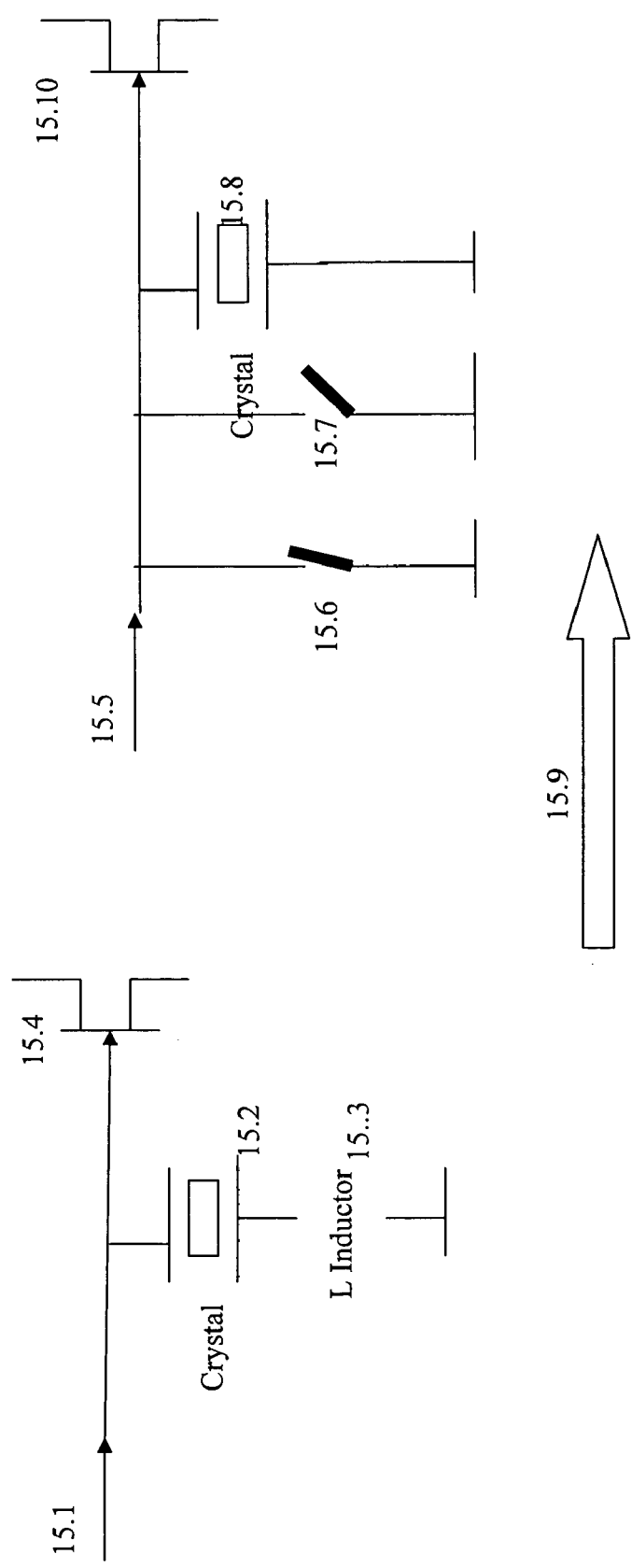
FIG. 15 is an embodiment of band-pass filters(BPF) with crystal filters and/or switched crystal filters.

One of the structures of this invention generates for one state data different waveforms than for zero state data, such as illustrated in FIG. 18*c*. The illustrated waveform for a one state information bit (or one state chip in case of spread spectrum signals) generates one single cycle of a carrier waveform while for a zero state information bit (or zero state chip in case of spread spectrum signals) generates one single cycle of a carrier waveform which has a different waveform shape than that for the one state. For example a one state bit could correspond to a single RF cycle having a sinusoidal shape while the zero state bit corresponds to a single RF cycle which corresponds to a reduced amplitude non sinusoidal shape (e.g. periodic square wave signal or a periodic multi-level signal such as generated by a D/A converter). Signals, such as illustrated in FIG. 18*c* are generated by alternative selection for one and zero states, in Unit 11.7, elements 11.7.2 and 11.7.6 or other combinations of elements. FIG. 12, FIG. 14, and FIG. 15, show receiver embodiments with and without crystal filters for reception and/or demodulation of a large class of signals, including reception and demodulation of the transmit signals disclosed in this application. In FIG. 12 the signal is received on lead 12.1 and connected to the receiver interface Unit 12.2. Receive interface Unit 12.2 contains splitters, amplifiers and filters and optional RF down-converters. The output signal of unit 12.2 is connected to one or multiple signal selection switch or signal splitter units 12.3. The selected or split signal(s) is/are provided by connection 12.5 and or processor and /or carrier recovery to switch or combiner elements 12.4. Switch or splitter and /or combiner control unit 12.10, receives control signals on lead 12.9 and determines the operation, regarding signal splitting, selection (switching) and combining, of units 12.3 and 12.5 The output of 12.4 is connected to one or multiple filters or processors, unit 12.6. Unit 12.6 contains a combination of Band-Pass-Filters(BPF), with or without Crystal Filters and or other filters such as Low-Pass-Filters(LPF) or High Pass Filters (HPF) and processors, or any combination or iteration of some or all of the aforementioned components. The 12.6 unit processed signals are connected to one or multiple demodulators, contained in Unit 12.7. The single or multiple demodulated data signals and clock signals are provided on output lead(s) 12.8.

Figure 13:
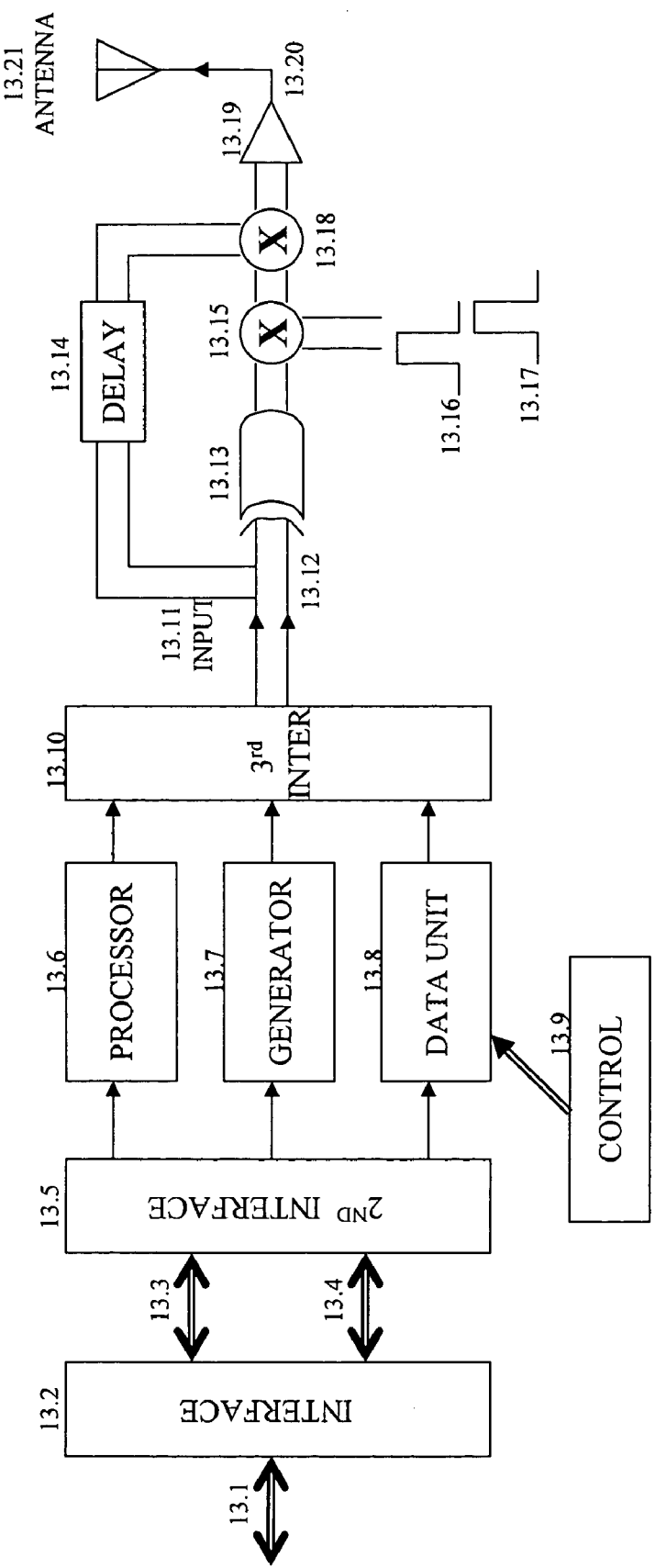
FIG. 13 is a reconfigurable single or multiple and interoperable transmitter architecture for Adaptive Modulation and Coding(AMC) systems for wireless systems, for wired systems, and/or UNB and UWB systems

FIG. 13 shows a reconfigurable and interoperable transmitter architecture for hybrid, Adaptive Modulation and Coding systems for wireless systems, for wired systems, for broadband wireless and/or UNB and UWB systems. On lead 13.1 data and clock signals are transferred to or from interface unit 13.2. Unit 13.2 processes the data/clock signals and provides a modified and/or new set of data and/or clock signals to the optional second interface unit 13.5 for further processing. Under the control of Unit 13.9, processor unit 13.6, generator 13.7 and data unit 13.8 connect their respective outputs to the 3$^{rd}$ optional interface unit. The signals at the outputs of units 13.6, 13.7 and 13.8 are processed or conditioned shaped signals, such as Modified Amplitude Wavelets(MAW) signals, Missing Cycle Modulation (MCM); Missing Chips (MCH) modulated signals or Phase Reversal Keying(PAR) and Phase Modification Keying(PMK) signals, or other narrowband or Ultra-narrowband(UNB) signals. Embodiment of FIG. 13 implements multiple combinations and hybrid implementations of hybrid ultra wideband (UWB) and ultra narrow band (UNB) signals, designated as Ultra wideband and ultra narrowband (UWN) systems or hybrid UWN systems. The output signals of unit 13.10 are converted into Ultra Wideband(UWB) modulated signals by an UWB converter containing logic device 13.13, delay element 13.14, multipliers 13.15 and 13.18 and further processed by one or multiple amplifiers 13.19, and provided by connection 13.20 to transmit antenna 13.21. Transmit antenna 13.21 comprises one or multiple antennas. Multipliers 13.15 and 13.18 are connected to one or more of the short duration pulses illustrated by 13.16 and 13.17. These short duration pulses are generated in the control unit 13.9 or are obtained from other parts of the system.

FIG. 14 represents an alternative receiver architecture and embodiment for reception and/or demodulation of a large class of signals, including reception and demodulation of the transmit signals disclosed in this application. In FIG. 14 the signal is received by one or multiple antennas, shown as unit 14.1 and connected to one or more receiver amplifiers, designated as a Low Noise Amplifier (LNA) Unit 14.2. Receive amplifier provides the amplified signal to Band Pass Filter (BPFl), Unit 14.3. The subsequent multiplier (also known as mixer), unit 14.4, receives on one of its input ports the filtered signal and on its second input port it receives a signal from oscillator (OSC) or frequency synthesizer (FS) unit 14.6. Signal lead 14.5 may provide one or multiple control signals to unit 14.6. The multiplier output signal is filtered by a BPF or other type of filter of unit 14.7. The filtered signal is provided to an Automatic Gain Control (AGC) unit 14.8, which could have a control signal input on lead 14.9. The AGC output is provided to a nonlinear device or hard limiter, shown as unit 14.10 and to a splitter 14.11. In the upper branch of the split signal there is an amplifier 14.12 and a delay element 14.13, while in the lower branch there is a Carrier Recovery (CR) or other discrete signal recovery circuit, shown as unit 14.14 and an optional delay element 14.15. Subsequent mixer 14.16 receives the upper branch and lower branch processed signals and provides a mixed (down-converted) signal to unit 14.8, which has LPF or BPF or other signal processing elements. The single or multiple outputs are provided on lead 14.19.

In an alternative embodiment of FIG. 14 splitter element 14.11 and 14.14 carrier recovery and delay 14.15 are not required. Instead of these components oscillator or frequency synthesizer 14.17 provides inputs to the second port of multiplier (mixer) 14.16.

FIG. 15 is an embodiment of band-pass filters(BPF) with crystal filters and/or optional switched crystal filters. Receiver and/or demodulators include in several embodiments BPF implementations. Part or all of band pass filtering (BPF) can be achieved by crystal filters. In some cases the crystal filters are between the signal path and ground while in others they are in a serial mode, that is in series with the signal path. On input lead 15.1 to the crystal filter the signal is connected to a crystal filter 15.2 and to a high impedance device such as a FET amplifier, unit 15.4. The crystal contains an inductor "L" element, shown as element 15.3. In an alternate embodiment of the BPF the signal is received on lead 15.5 and connected to switch elements 15.6, 15.7, crystal 15.8 and high input impedance circuit 15.10. Block arrow 15.9 represents the control signals which turn on and off switch components 15.6 and 15.7. The control signals are obtained from the data source and the data pattern.

FIG. 16 illustrates sample waveforms of illustrative data patterns of NRZ baseband signals for a 1001 bit pattern. Both unbalanced NRZ patterns and NRZ patterns are shown. In the unbalanced case of the unbalanced NRZ patterns, FIG. 16a, the signal has +2A amplitude for a one state and a zero(0) amplitude for a zero state. In the balanced case FIG. 16b the signal has a normalized +1 value for a one state and a normalized −1 value for a zero state. In FIG. 16c a Missing Cycle Modulated (MCM) signal pattern for a sample data pattern of 1001 bits is shown, with 1 missing cycle from 8 cycles for zero state signals and no missing cycles for 1 state signals. This signal is also designated as an MCY 1:8 signal. This modulation format is designated as missing cycle modulation (MCM) with 1:8 ratio. FIG. 16d shows a Phase Reversal Keying (PAR) modulated signal with a ratio of 1:8. The signal shown in FIG. 16d is designated as a Phase Reversal Keying (PAR) signal with 1:8 reversals, or ratio. It is also designated as of 1:8 reversals or PAR 1:8.

Figure 17:
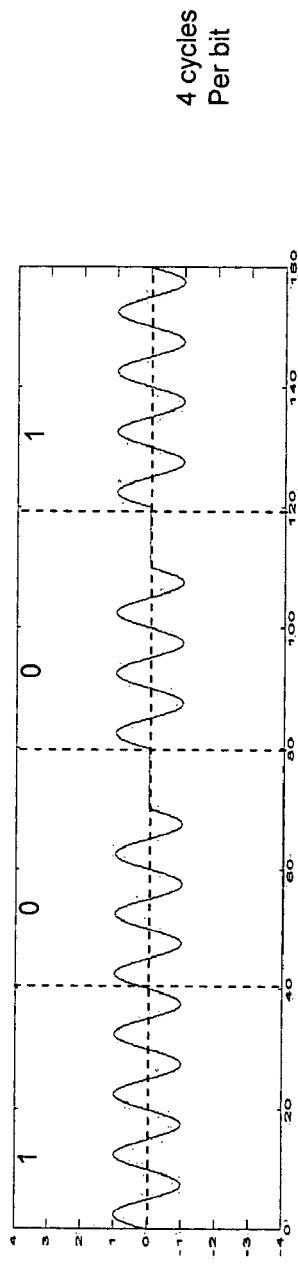
FIG. 17 illustrates a 2$^{nd}$ set of sample waveforms : a) Missing Cycle 1:4 modulation with 4 cycles per bit and b) Phase Reversal 1:4 modulation with phase reversals at start of bits for zero states
Figure 17:
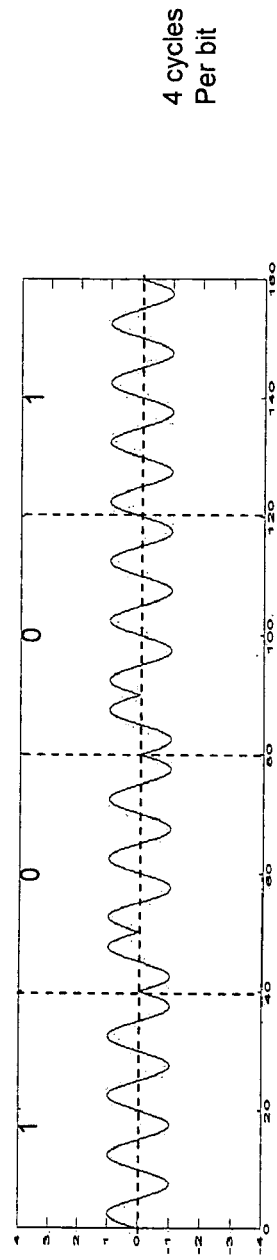

FIG. 17 represents a $2^{nd}$ set of generated sample waveforms. In FIG. 17a missing cycle modulated waveform with a 1:4 ratio is shown, while in FIG. 17.b a carrier phase reversal keying (PAR) modulated signal with a 1:4 phase reversal to non reversal ratio for zero state signals is shown; in these cases 4 cycles per bit, or alternatively for spread spectrum systems, 4 cycles per chip are illustrated.

Figure 19:
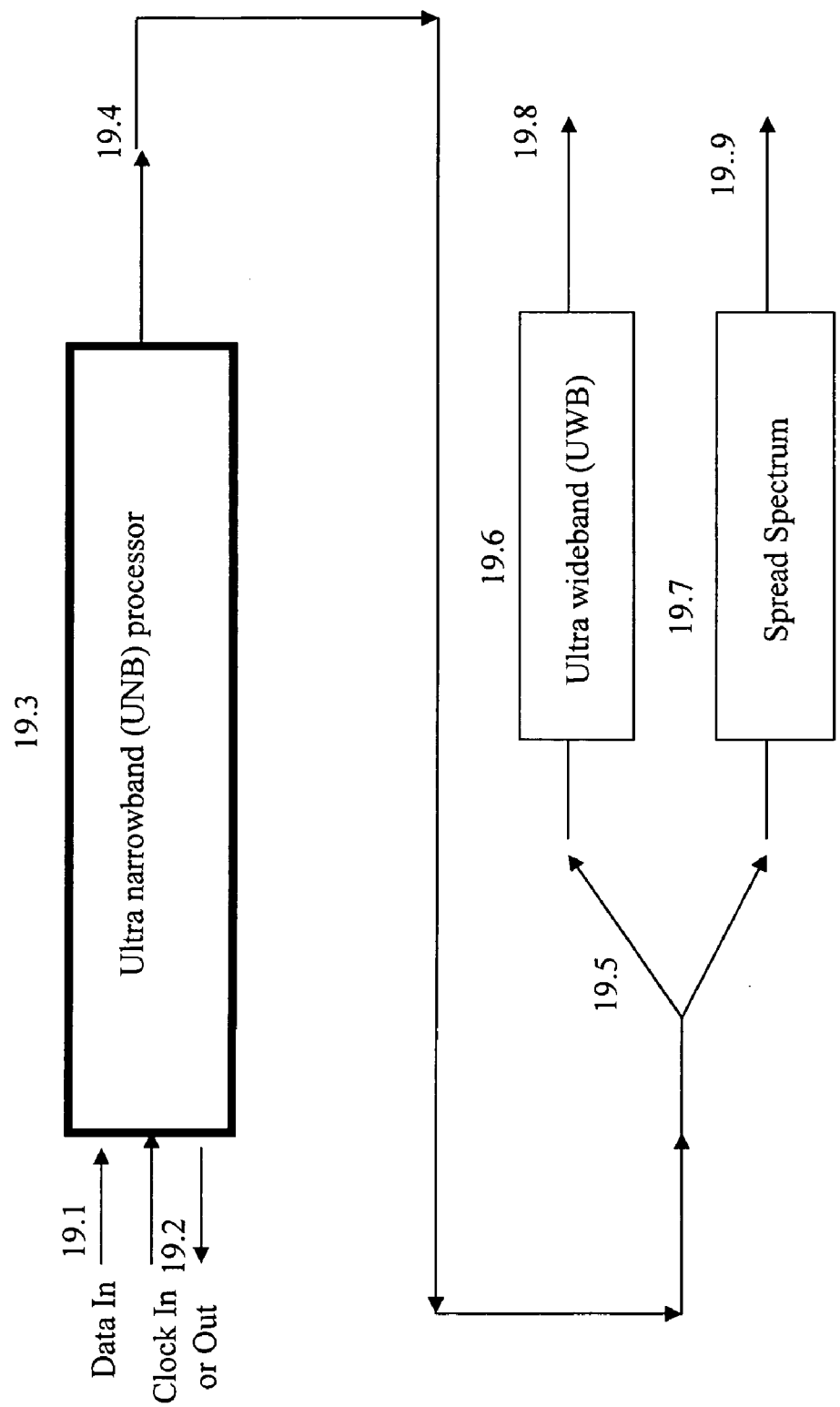
FIG. 19 is an embodiment of an ultra narrowband (UNB) processor and/or modulator connected to an ultra wideband (UWB) system and/or to a spread spectrum processor/transmitter; combinations and/or connections of UNB and of UWB systems lead to ultra wideband and ultra narrowband (UWN) systems

FIG. 18 shows modulated signal/carrier waveforms for: (a) 4 cycles per bit with reduced amplitudes for zero states; (b) single cycle per bit with zero transmit state for zero state (zero logic state) signals; (c) Single cycle per bit with one waveform transmission for 0 state signals and an other waveform for one state signals. FIG. 19 is an alternative "hybrid" embodiment of an ultra narrowband (UNB) processor and/or modulator connected to a broadband and/or an ultra wideband (UWB) system and/or to a spread spectrum processor/transmitter. Combinations, variations and/or connections of UNB and of UWB systems lead to hybrid ultra wideband and ultra narrowband (UWN) systems. Combinations of UNB of UWB and of spread spectrum systems are also designated as "hybrid" systems. Data input lead 19.1 provides binary data bits or other digital information to ultra narrowband (UNB) processor 19.3. Clock information into (In) the UNB processor and out of the UNB processor is provided on leads 19.2. The UNB processor provides UNB processed and/or UNB modulated signals to lead 19.4 for connection to splitter or switch element 19.5. The outputs of 19.5 are provided for further processing to the ultra wideband (UWB) unit 19.6 and/or to the spread spectrum unit 19.7, or to only one of these units. The UWB and spread spectrum signals are provided on leads 19.8 and 19.9 to the transmission medium. The signal flow-connection sequence between elements of FIG. 19 is interchanged in some of the alternative embodiments For example the data and clock leads are provided to/and from the ultra wideband unit 19.6 and/or spread spectrum unit 19.7 and in such case the ultra wideband signal is provided to the ultra narrowband processor 19.3 and/or the output of the spread spectrum unit 19.7 is provided to the input of the ultra narrowband unit 19.3. Variations and combinations of spread spectrum processors with ultra wideband or broadband processors and ultra narrowband processors lead to a new set of hybrid systems. Such hybrid systems are contrary to conventional communication systems and prior art technologies. While prior art systems disclose certain elements of this new set of hybrid systems, such as the embodiments of ultra narrowband systems, embodiments of ultra wideband systems and embodiments of spread spectrum systems, the prior art does not teach and it does not anticipate the use of these systems in a hybrid or combined mode as described in the current disclosure.

Unit 19.7 contains one or multiple prior art spread spectrum processors and/or one or more prior art spread spectrum modulators. Prior art spread spectrum processors and modulators include Direct Sequence Spread Spectrum(DSSS), Code Division Multiple Access (CDMA), Frequency Hopped Spread Spectrum(FHSS) and combinations, variations of other spread spectrum systems.

Figure 20:
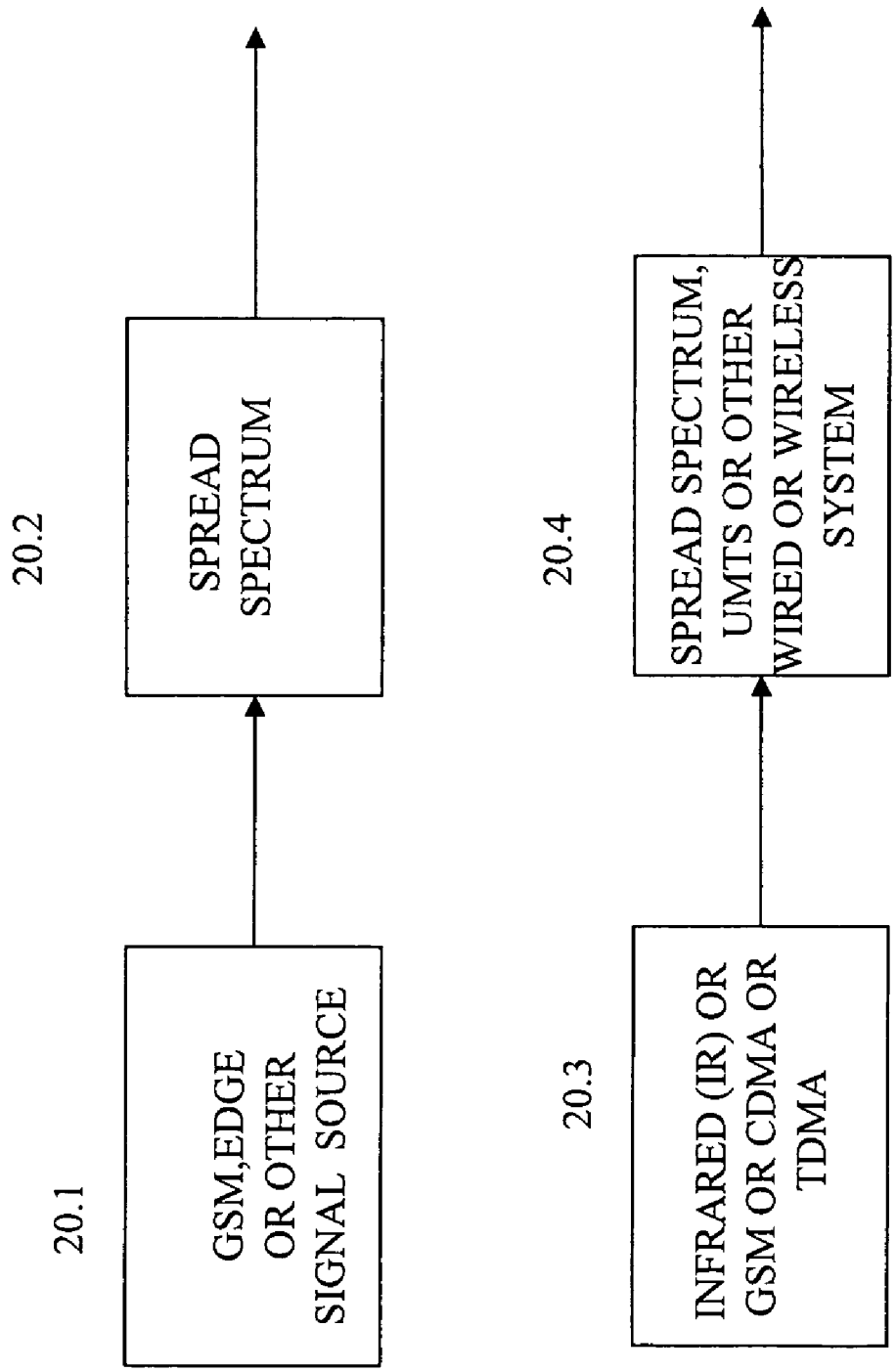
FIG. 20 shows block diagrams of cascaded (in-series) hybrid systems, including a cascaded GSM or EDGE, of cascaded Infrared(IR) or GSM or CDMA or TDMA or UMTS systems.

FIG. 20 shows embodiment of cascaded (in-series) hybrid systems, including a cascaded GSM or EDGE or other systems signal, generated or processed in unit 20.1 connected to one or multiple spread spectrum systems, unit 20.2, and a cascaded Infrared(IR) or GSM or CDMA or TDMA system, unit 20.3 cascaded (connected in series) with UMTS components or with other spread spectrum or other wired or wireless systems components.

Figure 21:
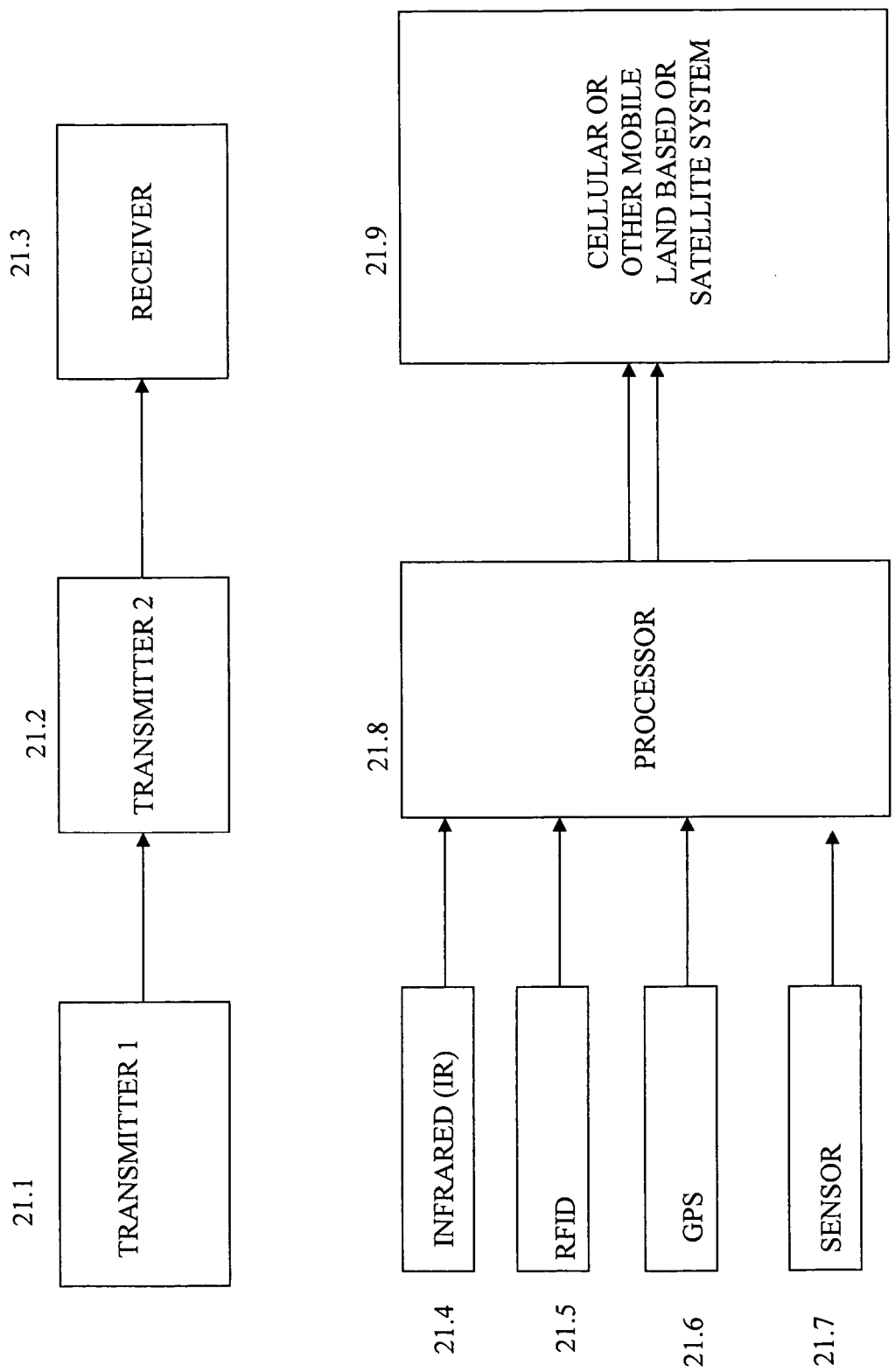
FIG. 21 shows a cascade of multiple transmitters connected to one or more receivers, including single or plurality of baseband or IF or RF signals for GSM, EDGE, TDMA, spread spectrum CSMA, CDMA signals for reconfigurable operations with infrared(IR), Radio Frequency identification (RFID),GPS and sensor systems.

FIG. 21 shows a cascade of multiple transmitters connected to one or more receivers. Unit 21.1, transmitter 1 is connected in baseband or IF or RF to Unit 21.2 transmitter 2. Either unit 21.1 or 21.2 contain one or a plurality of transmitters. Unit 21.3 contains one or more receivers. Single or plurality of baseband or IF or RF Signals, including GSM, EDGE, TDMA, spread spectrum CSMA, CDMA signals generated or processed in transmitter 1, unit 21.2, are connected for further processing in transmitter 2, unit 21.2. The cascaded processed signals are received by one or more receivers contained in unit 21.3. These receivers are in some embodiments parallel multiple path receivers, i.e. multiple receiver implementations) while in other embodiments are reconfigurable single path receivers. Unit 21.4 generates an infrared(IR) signal. Unit 21.5 is a signal processor and/or generator for Radio Frequency Identification(RFID) systems. Unit 21.6 is a GPS transmitter or receiver or entire GPS transceiver. Unit 21.7 is a sensor and processor device. One or more of the output signals of Units 21.4, 21.5, 21.6 and/or 21.7 are provided to processor Unit 21.8 for signal processing and or modulation. The Unit 21.8 processed signals are provided to Unit 21.9 for cellular or other land mobile or satellite system operation. The connection between the aforementioned optional blocks are at baseband or IF or RF.

Figure 22:
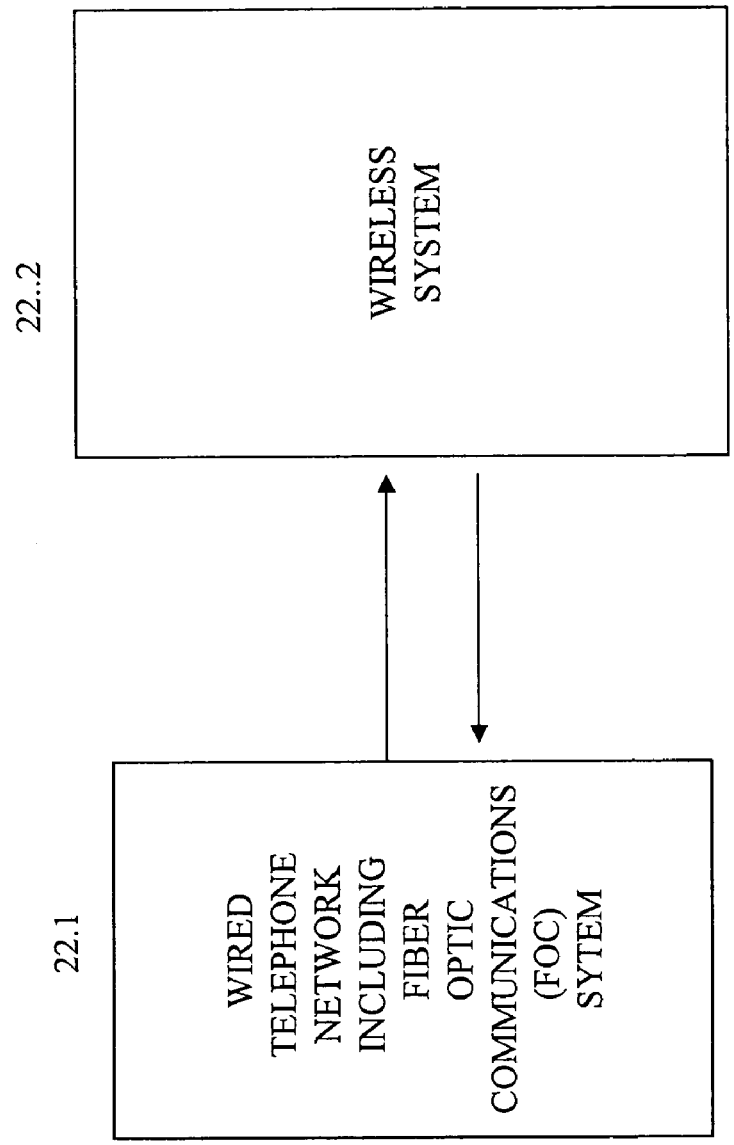
FIG. 22 shows a "hybrid" wired system interconnected with a wireless system, including interoperable wired fiber optic communication(FOC) interface and wireless systems.

FIG. 22 shows a "hybrid" wired system interconnected with a wireless system. Unit 22.1 contains a wired network unit, which includes one or more of telephone interface, fiber optic communication(FOC) interface or other wired interface units. The outputs or inputs of unit 22.1 provide or receive signals to or from wireless system 22.2. Wireless unit 22.2 contains one or more interface units or components of a wireless infrastructure or handset unit, such as a cellular base station, wireless base station, wireless terminal or handheld or other portable cellular or other wireless unit.

Having now described numerous embodiments of the inventive structure and method in connection with particular figures or groups of figures, and having set forth some of the advantages provided by the inventive structure and method, it should be noted that the embodiments described heretofore, as well as those highlighted below include optional elements or features that are not essential to the operation of the invention. The invention further provides methods and procedures performed by the structures, devices, apparatus, and systems described herein before, as well as other embodiments incorporating combinations and sub combinations of the structures highlighted above and described herein. The invention now being fully described, it will be apparent to one of ordinary skill in the art that many changes and modifications can be made thereto without departing from the spirit or scope of the appended claims.

What is claimed is:

1. A signal processing, modulation and transmission system for broadband, ultra wideband, ultra narrowband, hybrid ultra wideband and ultra narrowband, and spread spectrum reconfigurable structure comprising of:
   (a) an input port for receiving data signals;
   (b) an input port for receiving clock signals;
   (c) an ultra narrowband processor for processing said data and clock signals for providing ultra narrowband signals;
   (d) splitter or selection structure for providing said ultra narrowband signals to ultra wideband and/or spread spectrum processors for processing of data and clock signals and generation of ultra wideband and/or spread spectrum signals; and
   (e) connection lead to provide said signals to the transmission medium.

2. A communication and broadcasting system architectures, with combinations of ultra wideband, ultra narrowband and of efficient broadband wireless systems for Bit Rate Agile (BRA), Modulation Demodulation (Modem) Format Selectable (MFS) and Code Selectable (CS) systems comprising:
   (a) an input port for receiving data signals;
   (b) an input port for receiving clock signals;
   (c) a spread spectrum processor for processing said data and clock signals for providing spread spectrum signals;
   (d) a connection lead for providing said spread spectrum signals to ultra narrowband processors for processing of said spread spectrum signals and generation of spread spectrum ultra narrowband signals; and
   (e) connection lead to provide said signals to the transmission medium.

3. A Multiple Input-Multiple Output (MIMO) communication and broadcasting system architectures, with combinations of ultra wideband, ultra narrowband and of efficient broadband wireless systems comprising:
   (a) one or multiple input ports for receiving one or multiple data signals;
   (b) one or multiple input ports for receiving one or multiple clock signals;
   (c) one or multiple spread spectrum processors for processing said data and clock signals for providing one or multiple spread spectrum signals;
   (d) one or multiple connection leads for providing said one or multiple spread spectrum signals to one or multiple ultra narrowband processors for processing of said one or multiple spread spectrum signals and generation of one or multiple spread spectrum ultra narrowband signals; and
   (e) one or multiple connection leads to provide said signals to one or multiple transmission ports.

* * * * *